(12) United States Patent
Bhargava et al.

(10) Patent No.: US 8,938,800 B2
(45) Date of Patent: Jan. 20, 2015

(54) SYSTEM AND METHOD FOR NETWORK LEVEL PROTECTION AGAINST MALICIOUS SOFTWARE

(75) Inventors: Rishi Bhargava, Cupertino, CA (US); David P. Reese, Jr., Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 310 days.

(21) Appl. No.: 12/844,964

(22) Filed: Jul. 28, 2010

(65) Prior Publication Data

US 2012/0030750 A1    Feb. 2, 2012

(51) Int. Cl.
*G06F 21/00*    (2013.01)
*H04L 29/06*    (2006.01)

(52) U.S. Cl.
CPC .......... *H04L 63/02* (2013.01); *H04L 63/1408* (2013.01)
USPC .............................................. 726/22; 726/26

(58) Field of Classification Search
None
See application file for complete search history.

(56) References Cited

U.S. PATENT DOCUMENTS

| | | |
|---|---|---|
| 4,688,169 A | 8/1987 | Joshi |
| 4,982,430 A | 1/1991 | Frezza et al. |
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,907,709 A | 5/1999 | Cantey et al. |
| 5,907,860 A | 5/1999 | Garibay et al. |

(Continued)

FOREIGN PATENT DOCUMENTS

| | | |
|---|---|---|
| CN | 1383295 A | 12/2002 |
| CN | 103283202 A | 9/2013 |

(Continued)

OTHER PUBLICATIONS

Kurt Gutzmann, "Access Control and Session Management in the HTTP Environment," Jan./Feb. 2001, pp. 26-35, IEEE Internet Computing.

(Continued)

*Primary Examiner* — Philip Chea
*Assistant Examiner* — Carlton Johnson
(74) *Attorney, Agent, or Firm* — Patent Capital Group

(57) ABSTRACT

A method in one example implementation includes receiving information related to a network access attempt on a first computing device with the information identifying a software program file associated with the network access attempt. The method also includes evaluating a first criterion to determine whether network traffic associated with the software program file is permitted and then creating a restriction rule to block the network traffic if the network traffic is not permitted. The first criterion includes a trust status of the software program file. In specific embodiments, the method includes pushing the restriction rule to a network protection device that intercepts the network traffic associated with the software program file and applies the restriction rule to the network traffic. In more specific embodiments, the method includes searching a whitelist identifying trustworthy software program files to determine the trust status of the software program file.

30 Claims, 8 Drawing Sheets

(56) References Cited

U.S. PATENT DOCUMENTS

| | | |
|---|---|---|
| 5,926,832 A | 7/1999 | Wing et al. |
| 5,944,839 A | 8/1999 | Isenberg |
| 5,974,149 A | 10/1999 | Leppek |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 * | 6/2006 | McArdle et al. ............ 709/229 |
| 7,082,456 B2 | 7/2006 | Mani-Meitav et al. |
| 7,093,239 B1 | 8/2006 | van der Made |
| 7,096,500 B2 | 8/2006 | Roberts et al. |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,441,265 B2 | 10/2008 | Staamann et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,635 B2 | 3/2010 | Vega et al. |
| 7,698,744 B2 | 4/2010 | Fanton et al. |
| 7,703,090 B2 | 4/2010 | Napier et al. |
| 7,739,497 B1 | 6/2010 | Fink et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 * | 12/2010 | Bloch et al. ............ 726/22 |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,937,455 B2 | 5/2011 | Saha et al. |
| 7,950,056 B1 | 5/2011 | Satish et al. |
| 7,966,659 B1 * | 6/2011 | Wilkinson et al. ............ 726/22 |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,195,931 B1 | 6/2012 | Sharma et al. |
| 8,205,188 B2 | 6/2012 | Ramamoorthy et al. |
| 8,234,709 B2 | 7/2012 | Viljoen et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |
| 8,381,284 B2 | 2/2013 | Dang et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,701,182 B2 | 4/2014 | Bhargava et al. |
| 8,707,422 B2 | 4/2014 | Bhargava et al. |
| 8,707,446 B2 | 4/2014 | Roy-Chowdhury et al. |
| 8,713,668 B2 | 4/2014 | Cooper et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin et al. |
| 2002/0114319 A1 | 8/2002 | Liu et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |

(56) References Cited

U.S. PATENT DOCUMENTS

| | | |
|---|---|---|
| 2004/0051736 A1 | 3/2004 | Daniell |
| 2004/0054928 A1 | 3/2004 | Hall |
| 2004/0088398 A1 | 5/2004 | Barlow |
| 2004/0139206 A1 | 7/2004 | Claudatos et al. |
| 2004/0143749 A1 | 7/2004 | Tajali et al. |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0071633 A1* | 3/2005 | Rothstein ............ 713/167 |
| 2005/0086047 A1 | 4/2005 | Uchimoto et al. |
| 2005/0091321 A1 | 4/2005 | Daniell et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1* | 1/2008 | Yee et al. ............ 726/11 |
| 2008/0034416 A1 | 2/2008 | Kumar et al. |
| 2008/0034418 A1* | 2/2008 | Venkatraman et al. ...... 726/15 |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2009/0328144 A1 | 12/2009 | Sherlock et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0100970 A1 | 4/2010 | Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0302647 A1 | 12/2011 | Bhattacharya et al. |
| 2012/0030731 A1 | 2/2012 | Bhargava et al. |
| 2012/0110666 A1 | 5/2012 | Ogilvie |
| 2012/0216271 A1 | 8/2012 | Cooper et al. |
| 2012/0278853 A1 | 11/2012 | Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247226 A1 | 9/2013 | Sebes et al. |
| 2014/0101783 A1 | 4/2014 | Bhargava et al. |

FOREIGN PATENT DOCUMENTS

| | | |
|---|---|---|
| EP | 1 482 394 A2 | 12/2004 |
| EP | 2 037 657 A1 | 3/2009 |
| EP | 2599026 | 6/2013 |
| JP | 2004/524598 A | 8/2004 |

(56) References Cited

FOREIGN PATENT DOCUMENTS

| WO | WO 98/44404 | 10/1998 |
|---|---|---|
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |
| WO | WO 2012/116098 | 8/2012 |
| WO | WO 2013/058940 | 4/2013 |
| WO | WO 2013/058944 | 4/2013 |

OTHER PUBLICATIONS

U.S. Appl. No. 11/379,953, entitled "Software Modification by Group to Minimize Breakage," filed Apr. 24, 2006, Inventor(s): E. John Sebes et al.
U.S. Appl. No. 11/277,596, entitled "Execution Environment File Inventory," filed Mar. 27, 2006, Inventor(s): Rishi Bhargava et al.
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 10/806,578, entitled Containment of Network communication, filed Mar. 22, 2004, Inventor(s): E. John Sebes et al.
U.S. Appl. No. 10/739,230, entitled "Method and System for Containment of Usage of Language Interfaces," filed Dec. 17, 2003, Inventor(s): Rosen Sharma et al.
U.S. Appl. No. 10/935,772, entitled "Solidifying the Executable Software Set of a Computer," filed Sep. 7, 2004, Inventor(s): E. John Sebes et al.
U.S. Appl. No. 11/060,683, entitled "Distribution and Installation of Solidified Software on a Computer," Filed Feb. 16, 2005, Inventor(s): Bakul Shah et al.
U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.
U.S. Appl. No. 11/182,320, entitled "Classification of Software on Networked Systems," filed Jul. 14, 2005, Inventor(s): E. John Sebes et al.
U.S. Appl. No. 11/400,085, entitled "Program-Based Authorization," filed Apr. 7, 2006, Inventor(s): Rishi Bhargava et al.
U.S. Appl. No. 11/437,317, entitled "Connectivity-Based Authorization," filed May 18, 2006, Inventor(s): E. John Sebes et al.
U.S. Appl. No. 12/290,380, entitled "Application Change Control," filed Oct. 29, 2008, Inventor(s): Rosen Sharma et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/615,521, entitled "System and Method for Preventing Data Loss Using Virtual Machine Wrapped Applications," filed Nov. 10, 2009, Inventor(s): Sonali Agarwal, et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/839,856, entitled "Containment of Network Communication," filed Jul. 20, 2010, Inventor(s) E. John Sebes, et al.
U.S. Appl. No. 12/844,892, entitled "System and Method for Protecting Computer Networks Against Malicious Software," filed Jul. 28, 2010, Inventor(s) Rishi Bhargava, et al.
"Apache Hadoop Project," http://hadoop.apache.org/, retrieved and printed Jan. 26, 2011, 3 pages.
"Cbl, composite blocking list," http://cbl.abuseat.org, retrieved and printed Jan. 26, 2011, 8 pages.
A. Pitsillidis, K. Levchenko, C. Kreibich, C. Kanich, G.M. Voelker, V. Pason, N. Weaver, and S. Savage, "Botnet Judo: Fighting Spam with Itself," in *Proceedings of the 17th Annual Network and Distributed System Security Symposium (NDSS'10)*, Feb. 2010, 19 pages.
A. Ramachandran, N. Feamster, and D. Dagon, "Revealing botnet membership using DNSBL counter-intelligence," in *Proceedings of the 2nd USENIX Steps to Reducing Unwanted Traffic on the Internet*, 2006, 6 pages.
A. Ramachandran, N. Feamster, and S. Vempala, "Filtering Spam with Behavioral Blacklisting," in *Proceedings of ACM Conference on Computer Communications Security*, 2007, 10 pages.
B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in *Proceedings of the 16th ACM Conference on Computer and Communicatinos Security*, 2009, 13 pages.
C. Kanich, C. Kreibich, K. Levchenko, B. Enright, G.M. Voelker, P. Paxson, and S. Savage, "Spamalytics: An Empirical Analysis of Spam Marketing Conversion," in *Proceedings of the 15th ACM conference on Computer and Communications Security*, 2008, 12 pages.
C.J. Burges, "A Tutorial on Support Vector Machines for Pattern Recognition," in *Journal of Data Mining and Knowledge Discovery*, 1998, 43 pages.
E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.
G. Gu, J. Zhang, and W. Lee, "BotSniffer: Detecting Botnet Command and Control Channels in Network Traffic," in *Proceedings of the 15th Annual Network and Distributed System Security Symposium (NDSS'08)*, Feb. 2008, 24 pages.
G. Gu, P. Porras, V. Yegneswaran, M. Fong, and W. Lee, "BotHunter: Detecting Malware Infection Through IDS-Driven Dialog Correlation," in *Proceedings of the 16th USNIX Security Symposium*, 2007, 34 pages.
G. Gu, R. Perdisci, J. Zhang, and W. Lee, "BotMiner: Clustering Analysis of Network Traffic for Protocol and Structure-Independent Botnet Detection," in *Proceedings of the 17th USENIX Security Symposium*, 2008, 15 pages.
I. Jolliffe, "Principal Component Analysis," in *Springer Series in Statistics, Statistical Theory and Methods, 2nd ed.*), 2002, 518 pages.
J. Dean and S. Ghemawat, "MapRduce: Simplified Data Processing on Large Clusters," in *Proceedings of Sixth Symposium on Operating System Design and Implementation, OSDI*, 2004, 13 pages.
J. Goebel and T. Holz, "Rishi: Identify Bot Contaminated Hosts by IRC Nickname Evaluation," in *Proceedings of the USENIX HotBots*, 2007, 12 pages.

(56) References Cited

OTHER PUBLICATIONS

J.B. Grizzard, V. Sharma, C. Nunnery, B.B. Kang, and D. Dagon, "Peer-to-Peer Botnets: Overview and Case Study," in *Proceedings of the 1st Workshop on Hot Topics in Understanding Botnets*, Apr. 2007, 14 pages.
J.P. John, A. Moshchuk, S.D. Gribble, and A. Krishnamurthy, "Studying Spamming Botnets Using Botlab," in *Proceedings of the 6th USENIX Symposium on Networked Systems Design and Implementation*, 2009, 16 pages.
K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.
L. Zhuang, J. Dunagan, D.R. Simon, H.J. Wang, and J.D. Tygar, "Characterizing botnets from email spam records," in *Proceedings of the 1st Usenix Workshop on Large-Scale Exploits and Emergent Threats)*, 2008, 18 pages.
M. Frigo and S.G. Johnson, "The Design and Implementation of FFTW3," in *Proceedings of the IEEE 93(2), Invited paper, Special Issue on Program Generation, Optimization, and Platform Adaptation*, 2005, 16 pages.
R. Perdisci, I. Corona, D. Dagon, and W. Lee, "Detecting Malicious Flux Service Networks through Passive Analysis of Recursive DNS Traces," in *Proceedings of the 25th Annual Computer Security Applications Conference (ACSAC 2009)*, Dec. 2009, 10 pages.
X. Jiang, D. Xu, and Y.-M. Wang, "Collapser: A VM-Based Honeyfarm and Reverse Honeyfarm Architecture for Network Attack Capture and Detention," in *Journal of Parallel and Distributed Computing, Special Issue on Security In Grid and Distributed Systems*, 2006, 16 pages.
Y. Tang, S. Krasser, P. Judge, and Y.-Q. Zhang, "Fast and Effective Spam Sender Detection with Granular SVM on Highly Imbalanced Mail Server Behavior Data," in *Proceedings of 2nd International Conference on Collaborative Computing: Networking, Applications and Worksharing (CollaborativeCom)*, Nov. 2006, 6 pages.
Y. Zhao, Y. Xie, F. Yu, Q. Ke, Y. Yu, Y. Chen, and E. Gillum, "BotGraph: Large Scale Spamming Botnet Detection," in *Proceedings of the 6th USENIX Symposium on Networked Systems Design and Implementation*, 2009, 26 pages.
Yinglian Xie, Fang Yu, Kannan Achan, Rina Panigraphy, Geoff Hulten, and Ivan Osipkov, "Spamming Botnets: Signatures and Characteristics," *SIGCOMM '08*, Aug. 17, 22, 2008, http://ccr.sigcomm.org/online/files/p171-xie.pdf, pp. 171-182.
Z. Li, A. Goyal, Y. Chen, and P. Paxson, "Automating Analysis of Large-Scale Botnet probing Events," in *Proceedings of ACM Symposium on Information, Computer and Communications Security (ASIACCS))*, 2009, 12 pages.
Barrantes et al., "Randomized Instruction Set Emulation to Dispurt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Tal Garfinkel, et al., "Terra: A Virtual Machine-Based Platform for Trusted Computing," XP-002340992, SOSP'03, Oct. 19-22, 2003, 14 pages.
U.S. Appl. No. 12/880,125, entitled "System and Method for Clustering Host Inventories," filed Sep. 12, 2010, Inventor(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 13/012,138, entitled "System and Method for Selectively Grouping and Managing Program Files," filed Jan. 24, 2011, Inventor(s) Rishi Bhargava, et al.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
IA-32 Intel® Architecture Software Developer's Manual, vol. 3B; Jun. 2006; pp. 13, 15, 22 and 145-146.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
U.S. Appl. No. 13/728,705, filed Dec. 27, 2012, entitled "Herd Based Scan Avoidance System in a Network Environment," Inventor(s) Venkata Ramanan, et al.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.

(56) References Cited

OTHER PUBLICATIONS

Shacham, et al., "On the Effectiveness of Address-Space Randomization," CCS'04, Oct. 25-29, 2004, Washington, D.C., Copyright 2004, 10 pages.
International Search Report and Written Opinion mailed Dec. 14, 2012 for International Application No. 04796-1087WO, 9 pages.
International Preliminary Report on Patentability and Written Opinion issued Jan. 29, 2013 for International Application No. PCT/US2011/020677 (9 pages).
International Preliminary Report on Patentability and Written Opinion issued Jan. 29, 2013 for International Application No. PCT/US2011/024869 (6 pages).
USPTO Jun. 5, 2013 Notice of Allowance from U.S. Appl. No. 11/437,317.
USPTO Jun. 10, 2013 Notice of Allowance from U.S. Appl. No. 12/976,159.
USPTO Aug. 5, 2013 Notice of Allowance from U.S. Appl. No. 12/903,993.
USPTO Aug. 13, 2013 Notice of Allowance from U.S. Appl. No. 12/946,081.
USPTO Aug. 9, 2013 Office Action from U.S. Appl. No. 12/946,344.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
U.S. Appl. No. 13/032,851, filed Feb. 23, 2011, entitled "System and Method for Interlocking a Host and a Gateway," Inventors: Geoffrey Howard Cooper, et al.
USPTO Dec. 24, 2012 Nonfinal Office Action from U.S. Appl. No. 13/032,851.
USPTO Mar. 25, 2013 Response to Dec. 24, 2012 Nonfinal Office Action from U.S. Appl. No. 13/032,851.
USPTO Jul. 16, 2013 Final Office Action from U.S. Appl. No. 13/032,851.
International Search Report and Written Opinion, International Application No. PCT/US2012/026169, mailed Jun. 18, 2012, 11 pages.
U.S. Appl. No. 13/275,249, filed Oct. 17, 2011, entitled "System and Method for Redirected Firewall Discovery in a Network Environment," Inventors: Geoffrey Cooper, et al.
USPTO Feb. 28, 2013 Nonfinal Office Action from U.S. Appl. No. 13/275,249.
USPTO May 13, 2013 Response to Feb. 28, 2013 Nonfinal Office Action from U.S. Appl. No. 13/275,249.
International Search Report and Written Opinion, International Application No. PCT/US2012/057312, mailed Jan. 31, 2013, 10 pages.
U.S. Appl. No. 13/275,196, filed Oct. 17, 2011, entitled "System and Method for Host-Initiated Firewall Discovery in a Network Environment," Inventors: Geoffrey Cooper, et al.
USPTO Mar. 1, 2013 Nonfinal Office Action from U.S. Appl. No. 13/275,196.

USPTO Jun. 3, 2013 Response to Mar. 1, 2013 Nonfinal Office Action from U.S. Appl. No. 13/275,196.
International Search Report and Written Opinion, International Application No. PCT/US2012/057153, mailed Dec. 26, 2012, 8 pages.
U.S. Appl. No. 13/437,900, filed Apr. 2, 2012, entitled "System and Method for Interlocking a Host and a Gateway," Inventors: Geoffrey Howard Cooper, et al.
USPTO Mar. 1, 2013 Nonfinal Office Action from U.S. Appl. No. 13/437,900.
USPTO Jun. 3, 2013 Response to Mar. 1, 2013 Nonfinal Office Action from U.S. Appl. No. 13/437,900.
Office Action received for U.S. Appl. No. 12/844,892, mailed on Jan. 17, 2013, 29 pages.
Office Action received for U.S. Appl. No. 12/844,892, mailed on Sep. 06, 2012, 34 pages.
Response to Office Action received for U.S. Appl. No. 12/844,892, filed on Dec. 6, 2012, 34 pages.
Kim, et al., "A load cluster management system using SNMP and web", May 2002, pp. 367-378 available at: http://onlinelibrary.wiley.com/doi/10.1002/nem.453/pdf.
Papadopoulos, et al., "NPACI Rocks: tools and techniques for easily deploying manageable Linux clusters", Aug. 2002, pp. 707-725.
Pruett, et al., "BladeCenter systems management software", IBM J. Res. & Dev., vol. 49, No. 6 Nov. 2005, pp. 963-975.
Staub, et al., "Secure Remote Management and Software Distribution for Wireless Mesh Networks", Sep. 2007, pp. 1-8.
USPTO Feb. 24, 2014 Notice of Allowance from U.S. Appl. No. 13/629,765, 8 pages.
USPTO Mar. 24, 2014 Notice of Allowance from U.S. Appl. No. 13/275,196, 9 pages.
International Search Report and Written Opinion, International Application No. PCT/US2013/071327, mailed Mar. 7, 2014, 12 pages.
USPTO Apr. 15, 2014 Notice of Allowance from U.S. Appl. No. 12/844,892, 9 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, mailed Apr. 22, 2014, 5 pages.
International Preliminary Report on Patentability in International Application No. PCT/US2012/057153, mailed Apr. 22, 2014, 4 pages.
U.S. Appl. No. 14/263,164, entitled "System and Method for Redirected Firewall Discovery in a Network Environment," filed Apr. 28, 2014, Inventors: Geoffrey Cooper et al., 38 pages.
USPTO Sep. 13, 2013 Final Office Action from U.S. Appl. No. 13/275,249.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, mailed Aug. 27, 2013, 8 pages.
USPTO Oct. 2, 2013 Final Office Action from U.S. Appl. No. 13/275,196.
USPTO Oct. 4, 2013 Nonfinal Office Action from U.S. Appl. No. 12/844,892.
USPTO Oct. 25, 2013 Nonfinal Office Action from U.S. Appl. No. 12/844,964.
U.S. Appl. No. 14/045,208, filed Oct. 3, 2013, entitled "Execution Environment File Inventory," Inventors: Rishi Bhargava, et al.
PCT Application Serial No. PCT/US13/66690, filed Oct. 24, 2013, entitled "Agent Assisted Malicious Application Blocking in a Network Environment,", 67 pages.
Patent Examination Report No. 1, Australian Application No. 2011283160, mailed Oct. 30, 2013.
USPTO Sep. 27, 2013, Notice of Allowance from U.S. Appl. No. 13/437,900.

(56) References Cited

OTHER PUBLICATIONS

PCT Application Serial No. PCT/US13/71327, filed Nov. 21, 2013, entitled "Herd Based Scan Avoidance System in a Network Environment,", 46 pages.

USPTO Dec. 4, 2013 Nonfinal Office Action from U.S. Appl. No. 13/032,851.

U.S. Appl. No. 14/127,395, entitled "Agent Assisted Malicious Application Blocking in a Network Environment," filed Dec. 18, 2013, Inventors: Chandan CP et al.

USPTO Dec. 26, 2013 Notice of Allowance from U.S. Appl. No. 13/275,249.

USPTO Dec. 16, 2013 Notice of Allowance from U.S. Appl. No. 13/275,196.

USPTO Jan. 13, 2014 Notice of Allowance from U.S. Appl. No. 13/437,900.

Patent Examination Report No. 1, Australian Application No. 2011283164, mailed Jan. 14, 2014.

USPTO Dec. 30, 2013 Final Office Action from U.S. Appl. No. 13/629,765.

USPTO Jun. 4, 2014 Notice of Allowance from U.S. Appl. No. 13/032,851, 16 pages.

USPTO Jun. 4, 2014 Nonfinal Office Action from U.S. Appl. No. 13/728,705, 16 pages.

Jun. 2, 2014 Office Action in Korean Patent Appln. No. 2013-7022241, [English translation], 6 pages.

USPTO Aug. 11, 2014 Notice of Allowance from U.S. Appl. No. 12/844,892, 8 pages.

Aug. 12, 2014 Office Action in Japanese Patent Application No. 2013-555531, English translation, 3 pages.

USPTO Oct. 27, 2014 Notice of Allowance from U.S. Appl. No. 13/728,705, 25 pages.

\* cited by examiner (BATCH PROCESSING)

(REAL-TIME)

SYSTEM AND METHOD FOR NETWORK LEVEL PROTECTION AGAINST MALICIOUS SOFTWARE

RELATED U.S. APPLICATION INFORMATION

This application is related to co-pending U.S. patent application Ser. No. 12/844,892, filed Jul. 28, 2010, entitled "SYSTEM AND METHOD FOR LOCAL PROTECTION AGAINST MALICIOUS SOFTWARE," Inventors Rishi Bhargava, et al. The disclosure of this application is considered part of and is incorporated by reference herein in its entirety.

TECHNICAL FIELD

This disclosure relates in general to the field of network security and, more particularly, to network level protection against malicious software.

BACKGROUND

The field of network security has become increasingly important in today's society. The Internet has enabled interconnection of different computer networks all over the world. The ability to effectively protect and maintain stable computers and systems, however, presents a significant obstacle for component manufacturers, system designers, and network operators. This obstacle is made even more complicated due to the continually-evolving array of tactics exploited by malicious operators. Of particular concern more recently are botnets, which may be used for a wide variety of malicious purposes. Once a malicious software program file (e.g., a bot) has infected a host computer, a malicious operator may issue commands from a "command and control server" to control the bot. Bots can be instructed to perform any number of malicious actions such as, for example, sending out spam or malicious emails from the host computer, stealing sensitive information from a business or individual associated with the host computer, propagating the botnet to other host computers, and/or assisting with distributed denial of service attacks. In addition, the malicious operator can sell or otherwise give access to the botnets to other malicious operators through the command and control servers, thereby escalating the exploitation of the host computers. Consequently, botnets provide a powerful way for malicious operators to access other computers and to manipulate those computers for any number of malicious purposes. Security professionals need to develop innovative tools to combat such tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example implementation includes receiving information related to a network access attempt on a first computing device with the information identifying a software program file associated with the network access attempt. The method further includes evaluating a first criterion to determine whether network traffic associated with the software program file is permitted and creating a restriction rule to block the network traffic if the network traffic is not permitted. The first criterion includes a trust status of the software program file. In specific embodiments, the method includes pushing the restriction rule to a network protection device that intercepts the network traffic associated with the software program file and that applies the restriction rule to the network traffic. In more specific embodiments, the method includes searching a whitelist identifying trustworthy software program files to determine the trust status of the software program file, where the trust status of the software program file is defined as untrusted if the software program file is not included in the whitelist and the network traffic is not permitted if the trust status of the software program file is defined as untrusted. In yet other specific embodiments, event data related to the network traffic may be logged if the trust status of the software program file associated with the network traffic is defined as untrusted, and such logging may occur instead of blocking the network traffic or may occur in addition to blocking the network traffic.

Example Embodiments

Figure 1:
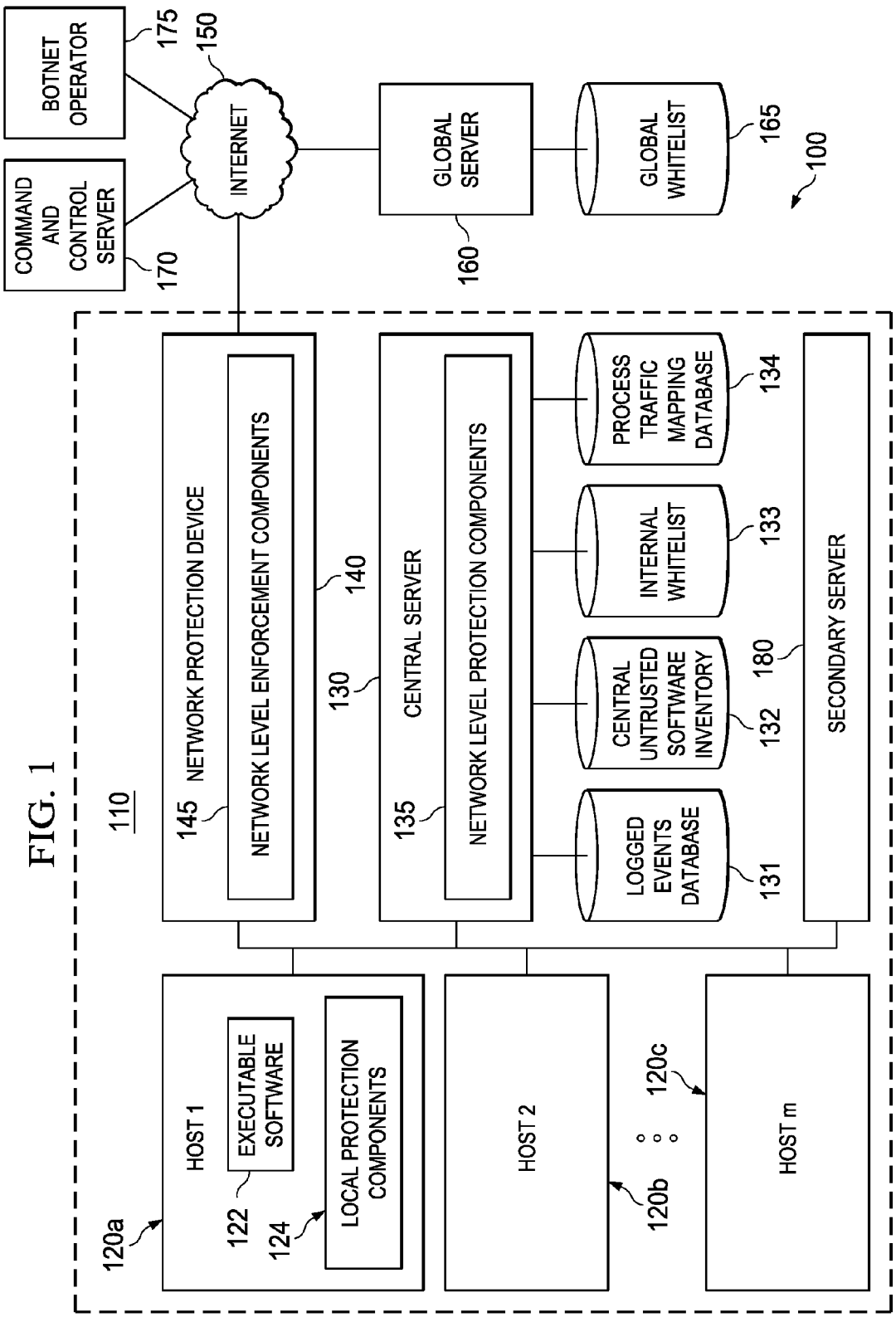
FIG. 1 is a pictorial representation of an exemplary network environment in which embodiments of a system for network level protection against malicious software may be implemented in accordance with the present disclosure.

FIG. 1 is a pictorial representation of an exemplary network environment 100 in which embodiments of a system for network level protection against malicious software may be implemented. Network environment 100 may include a local network 110 with electronic connection to a wide area network (WAN) such as Internet 150. The Internet 150 provides access to many other networks, computing devices, and web services. For example, a global server 160 may provide a database 165 containing global whitelists indicating software program files that have been evaluated and determined to be free of malicious code. In addition, malicious users such as a botnet operator 175 may also have access to the Internet 150 along with a command and control server 170, which may be manipulated by botnet operator 175 to send out and subsequently control malicious software (e.g., a bot) that attempts to infect networks, such as local network 110. Local network 110 may include hosts 120a, 120b, and 120c operably connected to a central server 130, a secondary server 180, and a network protection device 140. Host 120a may include executable software 122 and local protection components 124. For ease of reference, only host 120a is shown with such components, however, it will be apparent that any other hosts within local network 110 could also be configured with similar components as shown in host 120a of FIG. 1. Central protection components 135 may be provided in central server 130, and network level enforcement components 145 may be provided in network protection device 140. Central server 130 may also have access to a logged events database 131, a central untrusted software inventory 132, an internal whitelist 133, and a process traffic mapping database 134.

In example embodiments, local protection components 124 on host 120a, central protection components 135 on central server 130, and network level enforcement components 145 on network protection device 140 may cooperate to provide a system for network level protection against network traffic associated with malicious software. Network traffic, as used herein in this Specification, is intended to mean data in a network such as, for example, electronic packets being sent from a host to any network or other computer (i.e., outbound network traffic), and electronic packets being sent to the host from any network or other computer (i.e., inbound network traffic). Network traffic may be blocked or otherwise restricted by network protection device 140 if network protection device 140 includes an applicable restriction rule associated with an untrusted program file.

In accordance with embodiments of this disclosure, network protection device 140 may receive restriction rules created for network traffic when untrusted program files are discovered. A trust status (i.e., trusted or untrusted) of program files may be determined in a batch mode or may be determined in real-time during a network access attempt. A network access attempt as used herein in this Specification is intended to include any inbound or outbound network access attempt on a host (e.g., accepting a connection request, making a connection request, receiving electronic data from a network, sending electronic data to a network). In both batch mode and real-time mode, program files are evaluated to determine whether the trust status of each program file is defined as trusted or untrusted, using one or more trust evaluation techniques (e.g., whitelist comparisons, program file change comparisons, blacklist comparisons, etc.). Policies may also be used when creating restriction rules. Such policies may include, for example, only allowing access to a specified subnet of network addresses, blocking all inbound and outbound network traffic, blocking only inbound or outbound network traffic, blocking all local network traffic and allowing Internet traffic, and the like. Any network traffic associated with untrusted program files may also be logged and aggregated for reporting.

For purposes of illustrating the techniques of the system for network level protection against malicious software, it is important to understand the activities occurring within a given network. The following foundational information may be viewed as a basis from which the present disclosure may be properly explained. Such information is offered earnestly for purposes of explanation only and, accordingly, should not be construed in any way to limit the broad scope of the present disclosure and its potential applications. In addition, it will be appreciated that the broad scope of this disclosure intends for references to "program file", "software program file", and "executable software" to encompass any software file comprising instructions that can be understood and processed on a computer such as, for example, executable files, library modules, object files, other executable modules, script files, interpreter files, and the like.

Typical network environments used in organizations and by individuals include the ability to communicate electronically with other networks using, for example, the Internet to access web pages hosted on servers connected to the Internet, to send or receive electronic mail (i.e., email) messages, or to exchange files with end users or servers connected to the Internet. Malicious users are continuously developing new tactics using the Internet to spread malware and to gain access to confidential information.

Tactics that represent an increasing threat to computer security often include botnets. Botnets use a client-server architecture where a type of malicious software (i.e., a bot) is placed on a host computer and communicates with a command and control server, which may be controlled by a malicious user (e.g., a botnet operator). The bot may receive commands from the command and control server to perform particular malicious activities and, accordingly, may execute such commands. The bot may also send any results or pilfered information back to the command and control server. In addition to receiving commands to perform malicious activities, bots also typically include one or more propagation vectors that enable it to spread within an organization's network or across other networks to other organizations or individuals. Common propagation vectors include exploiting known vulnerabilities on hosts within the local network and sending malicious emails having a malicious program attached or providing malicious links within the emails. Bots may also infect host computers through, for example, drive-by downloads, viruses, worms, Trojan horses, etc.

Botnets provide a powerful way for botnet operators to compromise computer systems by employing a variety of attacks. Once a bot has infected a host computer, the command and control server can issue commands to the bot to perform various types of attacks. Commonly, botnets have been used to send bulk email and to perform distributed denial of service attacks. More recently, however, botnets have been used to perform more targeted attacks against businesses and individuals to obtain confidential data or other sensitive information such as intellectual property and financial data.

Existing firewall and network intrusion prevention technologies are generally deficient in recognizing and containing botnets. Bots are often designed to initiate communication with the command and control server and to masquerade as normal web browser traffic. Bots may be crafted with a command and control protocol that makes the bot appear to be making normal network connections to a web server. For example, a bot may use a port typically used to communicate with a web server. Such bots, therefore, may not be detected by existing technologies without performing more detailed packet inspection of the web traffic. Moreover, once a bot is discovered, the botnet operator may simply find another way to masquerade network traffic by the bot to continue to present as normal web traffic. More recently, botnet operators have crafted bots to use encryption protocols such as, for example, secure socket layer (SSL), thereby encrypting malicious network traffic. Such encrypted traffic may use a Hypertext Transfer Protocol Secure (HTTPS) port such that only the endpoints involved in the encrypted session can decrypt the data. Thus, existing firewalls and other network intrusion prevention technologies are unable to perform any meaningful inspection of the web traffic. Consequently, bots continue to infect host computers within networks.

Other software security technology focused on preventing unauthorized program files from executing on a host computer may have undesirable side effects for end users or employees of a business or other organizational entity. Network or Information Technology (IT) administrators may be charged with crafting extensive policies relevant to all facets of the business entity to enable employees to obtain software and other electronic data from desirable and trusted network resources. Without extensive policies in place, employees may be prevented from downloading software and other electronic data from network resources that are not specifically authorized, even if such software and other data are legitimate and necessary business activities. In addition, such systems may be so restrictive that if unauthorized software is found on a host computer, any host computer activities may be suspended pending network administrator intervention. For businesses, this type of system may interfere with legitimate and necessary business activities, resulting in worker downtime, lost revenue, significant Information Technology (IT) overhead, and the like.

A system and method for network level protection against malicious software, as outlined in FIG. 1, can reduce the propagation and malicious activities of botnets from infected networks, while allowing legitimate activities to continue within an infected network with less IT overhead being required. In accordance with one example embodiment, a system is provided to determine which software program files associated with a network access attempt on a host, such as host 120*a*, are a risk (i.e., untrusted). If each of the associated program files is not a risk (i.e., trusted), then network traffic associated with software processes mapped to those program files may be allowed. However, if one or more of the program files is untrusted, then restriction rules may be created to enable network protection device 140 to block or otherwise restrict network traffic associated with software processes mapped to the untrusted program files, and/or to block or otherwise restrict other network traffic in accordance with any applicable policies. Such blocking or other restriction may prevent propagation and malicious activities of a possible bot. In one example embodiment, when an untrusted program file is discovered, inbound and outbound network traffic of host 120*a* may be selectively permitted access to only a specified network subnet (e.g., a subnet known to be safe and required for necessary business activities, etc.), based on policy considerations. Thus, the ability of a bot to respond to commands from the command and control server and to propagate may be significantly diminished, without interrupting or preventing necessary business activities. As a result, the system as implemented in FIG. 1 provides better protection to networks with an infected host and to other networks the infected host attempts to access.

Turning to the infrastructure of FIG. 1, local network 110 is representative of an example architecture in which the system for network level protection may be implemented. Local network 110 may be configured in a variety of forms including, but not limited to, one or more local area networks (LANs), any other suitable network or any combinations thereof. The Internet 150 is representative of a wide area network (WAN) to which local network 110 may be suitably connected. Connection between local network 110 and Internet 150 may be provided through network protection device 140, which could be a common network security device (e.g., a firewall, a router, a gateway, a managed switch, etc.). In example embodiments, all network traffic to or from hosts 120 is routed through network protection device 140. An Internet Service Provider (ISP) or an Internet Server with dedicated bandwidth may provide connection to Internet 150 using any appropriate medium such as, for example, digital subscriber lines (DSL), telephone lines, T1 lines, T3 lines, wireless, satellite, fiber optics, cable, Ethernet, etc. or any combination thereof. Additional gateways, switches, routers, and the like may be used to facilitate electronic communication between hosts 120, central server 130, network protection device 140, and the Internet 150. The ISP or Internet Server may be configured to allow hosts 120 to communicate with other nodes on the Internet using Transmission Control Protocol/Internet Protocol (TCP/IP) and a mail server (not shown) may allow hosts 120 to send and receive email messages using Simple Mail Transfer Protocol (SMTP).

In example embodiments, local network 110 represents a network environment of an organization (e.g., a business, a school, a government entity, a family, etc.), with hosts 120*a*, 120*b*, and 120*c* representing end user computers operated by employees or other individuals associated with the organization. The end user computers may include computing devices such as desktops, laptops, mobile or handheld computing devices (e.g., personal digital assistants (PDAs) or mobile phones), or any other computing device capable of executing software processes associated with network access to local network 110. Connection between hosts 120*a*, 120*b*, and 120*c*, central server 130, secondary server 180, network protection device 145, and any additional components in local network 110 may include any appropriate medium such as, for example, cable, Ethernet, wireless (e.g., WiFi, 3G, 4G, etc.), ATM, fiber optics, etc. It should be noted that the network configurations and interconnections shown and described herein are for illustrative purposes only. FIG. 1 is intended as an example and should not be construed to imply architectural limitations in the present disclosure.

In the example embodiment shown in FIG. 1, command and control server 170 and botnet operator 175 are operably coupled to the Internet 150. In one example, command and control server 170 may be a web server controlled or used by botnet operator 175 to issue commands to distributed bots. In another example, command and control server 170 could be maliciously installed and hidden on a large corporate, educational, or government site. Botnet operator 175 may remotely access command and control server 170 through, for example, the Internet 150 to issue instructions for controlling distributed bots on infected host computers such as hosts 120*a*, 120*b*, or 120*c*. Numerous botnet operators and command and control servers controlling millions of bots may be operably connected to the Internet 150. In one example, once a bot has infected one of hosts 120*a*, 120*b*, or 120*c*, botnet operator 175 may begin issuing commands through command and control server 170 to propagate the bot throughout local network 110 and/or other networks. In addition, botnet operator 175 may also issue instructions for the bot to undertake malicious activities from the infected host 120a, 120b, or 120c such as spam email, theft of confidential information, distributed denial of service attacks, etc.

FIG. 1 also shows a global server 160 connected to Internet 150. While numerous servers may be connected to Internet 150, global server 160 represents a service providing one or more databases containing information related to software program files evaluated for risk. For example, software program files evaluated and determined to be untrustworthy (e.g., containing malicious code such as viruses, worms, and the like, etc.) may be included in a so-called "blacklist". Software program files evaluated and determined to be trustworthy (e.g., uncontaminated, free of malicious code, etc.) may be included in a so-called "whitelist". Although whitelists and blacklists may be implemented separately, it is also possible for them to be combined in a database with each software program file being identified as either a whitelist file or a blacklist file.

Whitelists and blacklists may be implemented using checksums where a unique checksum for each program file is stored, which can be readily compared to a computed checksum of a program file sought to be evaluated. A checksum can be a mathematical value or hash sum (e.g., a fixed string of numerical digits) derived by applying an algorithm to a software program file. If the algorithm is applied to a second software program file that is identical to the first software program file, then the checksums should match. However, if the second software program file is different (e.g., it has been altered in some way, it is a different version of the first software program file, it is a wholly different type of software, etc.) then the checksums are very unlikely to match.

Databases such as global whitelist 165 in FIG. 1 may be provided by independent third parties and may be regularly updated to provide a comprehensive listing of trustworthy software program files available to consumers. Similarly, blacklists (not shown) may be provided by independent third parties and may be regularly updated to provide a comprehensive listing of untrusted, malicious software program files. Global whitelists and blacklists may be external to local network 110 and may be accessible through other networks such as Internet 150, or through any other suitable connection that permits electronic communication between local network 110 and global whitelist 165. Examples of such global whitelists and blacklists include Artemis databases provided by McAfee, Inc. of Santa Clara, Calif., and SignaCert® databases provided by SignaCert, Inc. of Portland, Oreg.

FIG. 1 also includes an internal whitelist 133 shown in local network 110. Internal whitelist 133 may also contain information related to software program files evaluated for risk and may identify such software program files using checksums. Software program files identified in internal whitelist 133 may be inclusive of software program files from one or more global whitelists and/or may be customized to provide selected software program files. In particular, software program files developed internally within the organization, but not necessarily available to the general public, may be identified in internal whitelist 133. Additionally, an internal blacklist could also be provided to identify particular software program files evaluated and determined to be untrustworthy.

In local network 110 shown in FIG. 1, host 120a may be configured with executable software 122 and local protection components 124. Executable software 122 may include all software program files (e.g., executable files, library modules, object files, other executable modules, script files, interpreter files, etc.) on host 120a. If host 120a has been infected by a bot, then the bot could be stored as a program file in executable software 122 of infected host 120a. Local protection components 124 of host 120a may provide different functionality depending upon the embodiment. In some embodiments of the system, local protection components 124 may regularly provide an inventory of executable software 122 or an inventory of changes and additions to executable software 122 on host 120a. In real-time embodiments of the system, local protection components 124 may intercept a network access attempt and provide information related to the network access attempt to central server 130. Local protection components 124 may also hold the network access attempt for a predetermined amount of time or until receiving a signal from central server 130 allowing the network access attempt to be released.

Central server 130 in local network 110 may include central protection components 135 for determining a trust status of software program files on host 120a, for creating restriction and logging rules for network traffic associated with untrusted software program files, for pushing restriction and logging rules to network protection device 140, and for updating logged events database 131 with entries related to network traffic associated with untrusted program files. In some embodiments central protection components may also update central untrusted software inventory 132 with entries identifying untrusted software program files. Central server 130 may also include or have access to process traffic mapping database 134, which could map software processes to software program files, including information such as program file paths, addresses (e.g., Internet Protocol (IP) addresses), and/or port numbers. Logged events database 131, central untrusted software inventory 132, internal whitelist 133, and process traffic mapping database 134 may be provided in any network and device accessible to central server 130. As will be further described herein, central untrusted software inventory 132 may be omitted in some embodiments of the system. Network protection device 140 may include network level enforcement components 145 for intercepting network traffic (e.g., electronic packets inbound to host 120a or outbound from host 120a, etc.) and enforcing any applicable restriction and logging rules to the intercepted packets.

Figure 2:
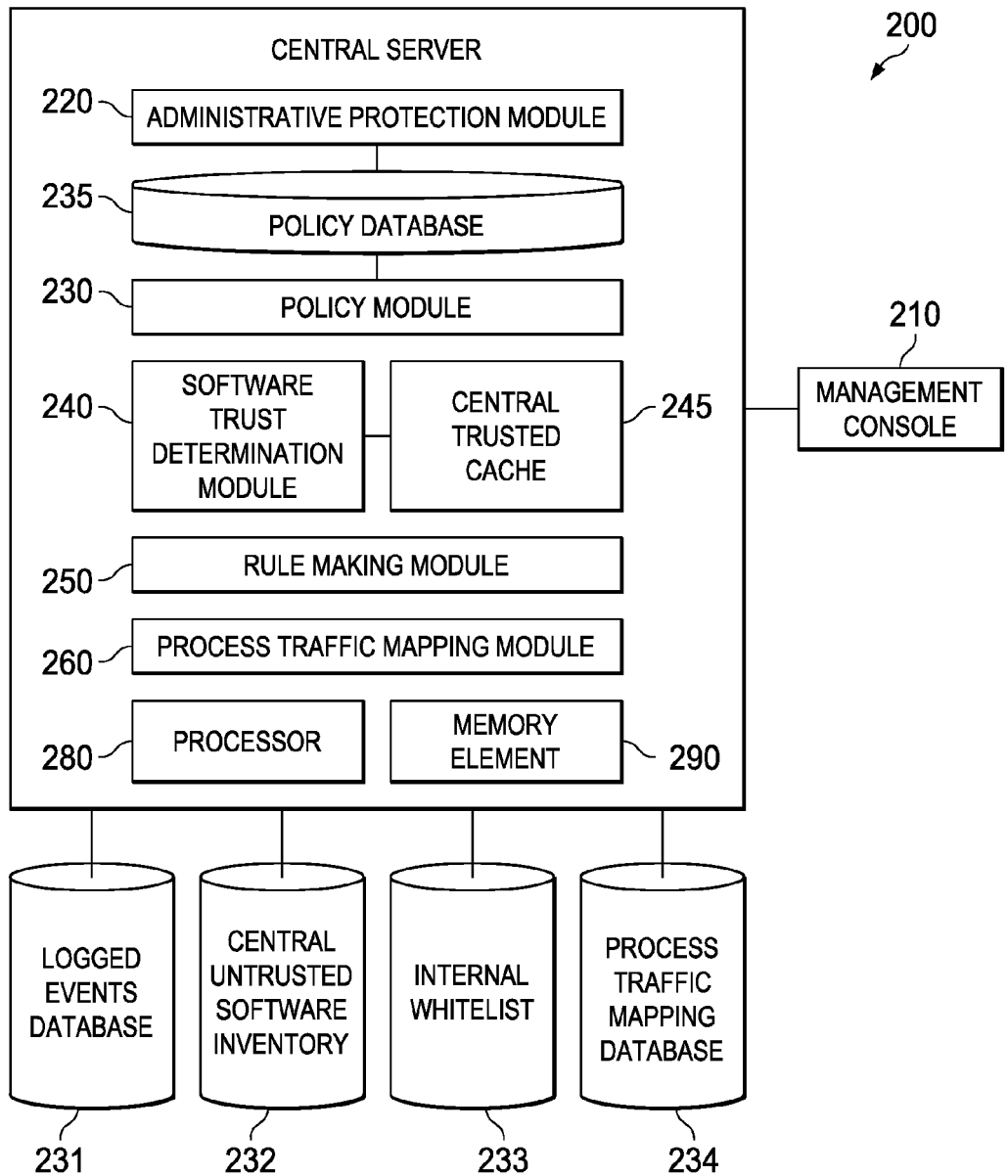
FIG. 2 is a block diagram of an example server in which components of the system may be implemented in accordance with embodiments of the present disclosure.

Turning to FIG. 2, FIG. 2 shows a schematic diagram of a central server 200 and associated memory components 231, 232, 233, and 234, which is a more detailed example of central server 130 and associated memory components 131, 132, 133, and 134 shown in FIG. 1. In the example embodiment shown in FIG. 2, central protection components of central server 200 may include an administrative protection module 220, a policy module 230, a policy database 235, a software trust determination module 240, and a rule making module 250. In some embodiments, central protection components may also include a central trusted cache 245 for storing trusted program file cache entries from software trust determination module 240. Rule making module 250 may be configured in a batch processing mode embodiment, or in a real-time (or substantially real-time) processing embodiment. In both batch processing and real-time processing embodiments of rule making module 250, network restriction rules and/or logging rules may be created when untrusted program files are discovered. Central protection components may also include a process traffic mapping module 260 for updating process traffic mapping database 234 with information related to a software process such as program file information, source address and port number, destination address and port number, and the like.

Central server 200 may also include or have access to appropriate hardware and memory elements such as, for example, a logged events database 231 and an internal whitelist 233. In some embodiments, central server 200 may also include or have access to a central untrusted software inventory 232, and in other embodiments central untrusted software inventory 232 may not be a required component of the system. Other hardware elements including a processor 280 and a memory element 290 may also be included in central server 200. Finally, a management console 210 may be suitably connected to central server 200 for authorized persons to deploy, configure, and maintain the system through an administrative component such as administrative protection module 220.

In embodiments using central trusted cache 245, the cache may be implemented in hardware as a block of memory for temporary storage of entries (e.g., checksums) identifying program files that have been previously determined to have a trusted status, such as those program files found during searches of global and/or internal whitelists. Central trusted cache 245 can provide quick and transparent access to data indicating program files previously evaluated for a trust status. Thus, if a requested program file is found in central trusted cache 245 then a search of global and/or internal whitelists, or any other trust evaluation, may not need to be performed. In addition, embodiments using central trusted cache 245 may not need to maintain central untrusted software inventory 232.

Figure 3:
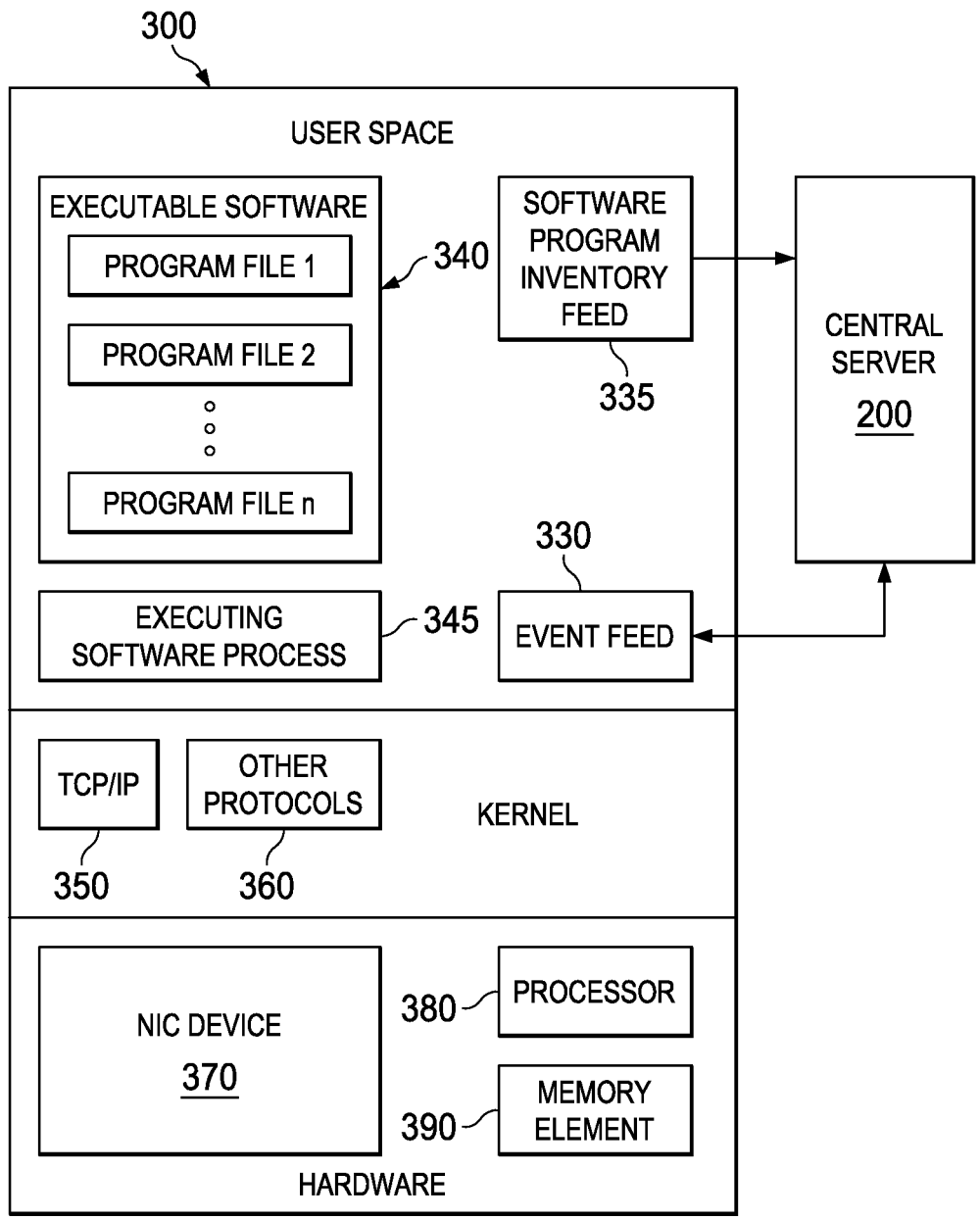
FIG. 3 is a schematic diagram of an example computing device in which components of the system may be implemented in accordance with embodiments of the present disclosure.

Turning to FIG. 3, FIG. 3 shows a schematic diagram of one embodiment of a computing device or host 300 and a block diagram of central server 200, in which the system for network level protection against malicious software may be implemented. Host 300 is a more detailed example of host 120a of FIG. 1. Host 300 includes a set of executable software 340 including, for example, program files 1 through n. In some embodiments such as, for example, the real-time processing embodiment, local protection components in host 300 may include an event feed 330 with a bidirectional flow to central server 200 for intercepting a network access attempt on host 300 and sending host event information (i.e., information related to the network access attempt and its associated program files) to central server 200. Event feed 330 may also be configured to hold the network access attempt for a predetermined time or until a signal is received from central server 200, in order to allow any resulting network restriction and/or logging rules to be pushed to network protection device 400 before releasing the network access attempt.

In various embodiments of the system such as the batch processing embodiment or certain real-time processing embodiments, local protection components may include software program inventory feed 335 with a data flow to central server 200 for pushing an inventory of executable software 340 or an inventory of new and/or changed program files in executable software 340 to central server 200. Event feed 330 and software program inventory feed 335 may reside in the user space of host 300. Also shown in user space of host 300 is an example executing software process 345, which corresponds to one or more of the program files of executable software 340. For ease of reference, executable software 340 is shown in user space on host 300. However, executable software 340 may be stored in a memory element such as disk space of host 300.

Host 300 may also include hardware components such as a network interface card (NIC) device 370, a processor 380, and a memory element 390. Transmission protocols, such as Transmission Control Protocol/Internet Protocol (TCP/IP) 350 and other protocols 360, may reside in a kernel space of host 300.

Not shown in FIGS. 2 and 3 is additional hardware that may be suitably coupled to processors 280 and 380 in the form of memory management units (MMU), additional symmetric multiprocessing (SMP) elements, physical memory, Ethernet, peripheral component interconnect (PCI) bus and corresponding bridges, small computer system interface (SCSI)/integrated drive electronics (IDE) elements, etc. In addition, suitable modems and/or additional network adapters may also be included for allowing network access. Central server 200 and host 300 may include any additional hardware and software necessary to properly perform their intended functions. Furthermore, any suitable operating systems will also be configured in central server 200 and host 300 to appropriately manage the operation of hardware components therein. It will be appreciated that the hardware configurations may vary and the depicted examples are not meant to imply architectural limitations.

Figure 4:
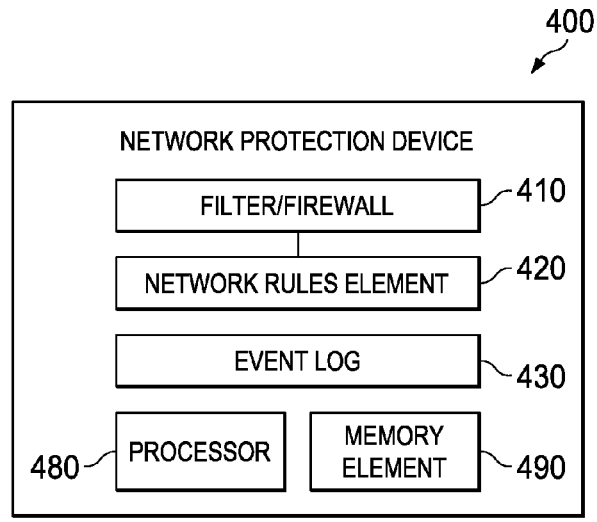
FIG. 4 is a block diagram of an example network protection device in the network environment in which the system may be implemented in accordance with embodiments of the present disclosure.

Turning to FIG. 4, FIG. 4 shows a schematic diagram of a network protection device 400, which may be used in the system for network level protection against malicious software. Network protection device 400 is an example of network protection device 140 of FIG. 1. Network level enforcement components of network protection device 400 may include a filter/firewall 410, a network rules element 420, and an event log 430. Network protection device 400 may also include hardware components such as a processor 480 and a memory element 490. In example embodiments, network protection device 140 may be a common network security device (e.g., a firewall, a router, a web gateway, a mail gateway, a managed switch, etc.) and may include other suitable hardware and software components as required to perform its intended functions.

In network protection device 400, filter/firewall 410 may intercept network traffic (e.g., electronic packets outbound from local network 110, inbound to local network 110, or within local network 110) and may query network rules element 420 to determine whether any restriction and/or logging rules apply to the particular intercepted packets of network traffic. If an applicable restriction rule is found, then it is applied to the packets, which may be blocked, rerouted, selectively allowed, and the like. Event log 430 may be provided in network protection device 400 for logging network traffic event data. Network traffic event data may include information related to particular packets received by network protection device 400 such as, for example, source address and port number, destination address and port number, date and time stamp, and/or rule ID (i.e., identifier indicating a restriction or logging rule applied to the intercepted packets). Such logging may occur if network rules element 420 has a logging rule corresponding to the particular packets received by network protection device 400 or if logging is performed by default such as, for example, logging a network traffic event when a restriction rule is applied to packets corresponding to the network traffic event.

In various example embodiments, trust determination, logging, and rule-making activities may be provided by administrative protection module 220, policy module 230, software trust determination module 240, rule making module 250, and process traffic mapping module 260 of central server 200 and by software program inventory feed 335 and/or event feed 330 of host 120a. Information related to the trust determination, logging, and rule making activities can be suitably rendered, or sent to a specific location (e.g., central server 200, network rules element 420, etc.) or simply stored or archived (e.g., logged events database 231, central untrusted software inventory 232, policy database 235, process traffic mapping database 234, central trusted cache 245, etc.), and/or properly displayed in any appropriate format (e.g., through management console 210, etc.). Security technology that relates to one or more of such trust determination, logging, and rule-making activities can include elements of McAfee® software (e.g., ePolicy Orchestrator, Application Control, and/or Change Control) or any other similar software. Thus, any such components may be included within the broad scope of the terms 'administrative protection module', 'policy module', 'software trust determination module', 'rule making module', 'process traffic mapping module', 'software program inventory feed', and 'event feed' as used herein in this Specification. Logged events database 231, central untrusted software inventory 232, internal whitelist 233, process traffic mapping database 234, policy database 235, central trusted cache 245, network rules element 420, and event log 430 may include information related to the trust determination, logging, and rule making for electronic data (e.g., trust determinations for program files, network access attempts, destination address and port numbers of software processes, source address and port numbers of software processes, network restriction rules, logging rules, etc.), and these elements can readily cooperate, coordinate, or otherwise interact with the modules and components of host 300, central server 200, and network protection device 400.

FIGS. 5-12 include flowcharts of example embodiments of flows associated with various embodiments of the system and method for network level protection against malicious software. For ease of reference, FIGS. 5-12 will be described herein with references to certain components in network environment 100 of FIG. 1 and to server 200, host 300, network protection device 400, and their associated components, elements, and modules, although various other devices, components, elements, modules and the like may be used to implement the network level embodiment of the system and method shown and described herein.

Figure 5:
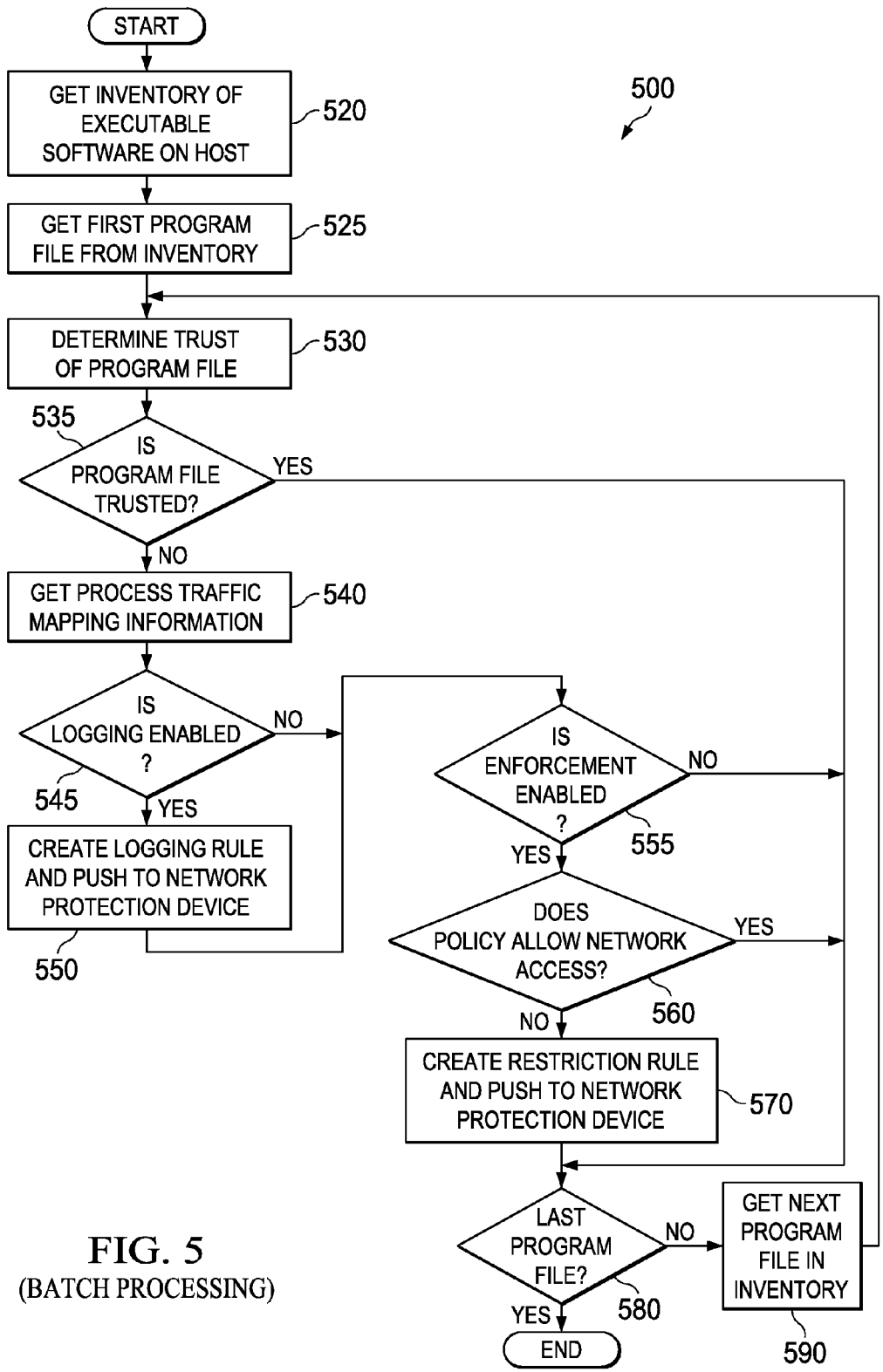
FIG. 5 is a simplified flowchart illustrating a series of example steps associated with embodiments of the system in accordance with the present disclosure.

Turning to FIG. 5, batch processing flow 500 illustrates a flow for batch processing embodiments of the system for network level protection that may be implemented at least in part as rule making module 250 of central server 200. In embodiments of the system implementing batch processing flow 500, neither central trusted cache 245 of central server 200, nor central untrusted software inventory 232 may be necessary. Batch processing flow 500 may run at any suitable predefined intervals of time (e.g., hourly, every half-hour, etc.). Flow may begin at step 520 where an inventory of executable software is received from a host, such as host 300. Central server 200 may poll host 300 for the inventory, which may be provided by software program inventory feed 335. Software program inventory feed 335 may be configured to provide central server 200 with a complete updated software inventory on host 300 or with an inventory of software program file additions and/or changes on host 300. Software program inventory feed 335 could be implemented with existing security software such as, for example, Policy Auditor software or Application Control software, both manufactured by McAfee, Inc. of Santa Clara, Calif.

After receiving the software inventory, flow passes to step 525 where a first program file is retrieved from the software inventory. Flow then passes to step 530 to determine a trust status (i.e., trusted or untrusted) of the program file. Trust status may be determined by software trust determination module 240 of central server 200 using one or more software trust determination techniques (e.g., evaluating internal whitelists, evaluating external whitelists, evaluating state change of program files, evaluating blacklists, etc.), which will be shown and described further herein with reference to FIGS. 6 and 7.

After the program file trust status is determined in step 530, flow passes to step 535 where a query is made as to whether the program file is trusted. If the program file is trusted, then flow passes to step 580 to bypass creating network restriction or logging rules and to continue looping through the software inventory to evaluate each program file. However, if the program file trust status is untrusted in step 535, then flow passes to step 540 where process traffic mapping information is obtained for the untrusted program file from process traffic mapping database 234. The process traffic mapping information may include, for example, source address and destination port number mapped to the program file, which can be used to create rules to log and/or restrict network traffic.

After the process traffic mapping information is retrieved for the program file, a query is made as to whether logging is enabled in step 545. If the query in step 545 indicates that logging is enabled, then flow passes to step 550 where a logging rule may be created and then pushed to network protection device 400 to be stored in network rules element 420. In one example, the source address and destination port number from the process traffic mapping information retrieved in step 540 could be used to create a rule to log particular network event data. In this example, the logging rule could require network traffic event data related to electronic packets intercepted by network protection device 400 to be stored in event log 430 when the intercepted packets have a source address and a destination port matching the process traffic mapping information. In some embodiments, a rule ID identifying the logging rule may be stored in process mapping database 234 and mapped to the untrusted program file.

After the logging rule has been created and pushed to network protection device 400 in step 550, or if logging is not enabled in step 545, then flow passes to step 555 where a query is made as to whether enforcement is enabled. If enforcement is not enabled, then flow passes to step 580 to bypass creating a network restriction rule for the untrusted program file and to continue looping through the software inventory to evaluate the remaining program files in the software inventory. If enforcement is enabled in step 555, however, then policy database 235 may be queried in step 560 to determine whether any configured policy overrides the untrusted status of the program file to allow network traffic associated with the program file. In example embodiments, policy module 230 of central server 200 may allow a network administrator or other authorized user to craft policy configurations through management console 210, and to store such policies in policy database 235. Policy database 235 may then be queried in step 560 for any policies relevant to the untrusted program file.

If a policy is found in policy database 235 that overrides the untrusted status of the program file, then flow passes to step 580 to bypass creating a network restriction rule for the untrusted program file and to continue looping through the software inventory to evaluate the remaining program files in the software inventory. However, if a policy does not override the untrusted status of the program file (i.e., a policy requires some type of restriction rule or no policy is applicable), then flow passes to step 570 where one or more network restriction rules can be created using process traffic mapping information and/or any applicable policies.

Policies may be used to create various types of restriction rules, and these policy configurations may be implemented as desired by particular network owners. In some example embodiments, policy configurations may include one or more broad-based restrictions such as blocking all inbound and outbound network traffic, blocking all inbound network traffic and allowing outbound network traffic, or allowing inbound network traffic and blocking outbound network traffic. More specific strategies may also be employed, such as blocking outbound network traffic to the local network but allowing outbound network traffic to the Internet, or allowing inbound network traffic from a specified subnet of source addresses and/or allowing outbound network traffic to a specified subnet of destination addresses. Finally, even more granular strategies may be used such as blocking specific inbound services and/or specific outbound services on a port (e.g., domain name service (DNS), simple mail transfer protocol (SMTP), Internet Relay Chat (IRC), etc.). These example policy configurations are for illustrative purposes, and are intended to include any other policy configurations to restrict inbound, outbound, and/or local network traffic or any combination thereof. Such policies may be implemented in the system for network level protection by routing network traffic through network protection device 400, which applies network restriction rules created using the configured policies.

Particular policy configurations may be balanced between competing interests such as the need to prevent the propagation and potentially malicious activities of untrusted software and the need to conduct necessary business activities. For example, in a network having a host subnet and a server subnet, a policy may be configured to allow network traffic associated with untrusted program files to access only the server subnet but not the host subnet. This may be desirable because it may prevent the propagation of malicious software to other hosts within the network, while allowing each host uninterrupted access to a secured server subnet. Another policy may block network traffic associated with untrusted program files from accessing the Internet except for a known subnet hosting job critical services. Thus, many different blocking options may be employed by crafting policies allowing selective network access.

In embodiments of the system and method for network level protection, network level specific policies may also be crafted for untrusted program files. For example, a policy may be crafted to redirect network traffic associated with an untrusted program file to another server, such as secondary server 180. In one example, potentially malicious network traffic associated with an untrusted program file could be forced through additional firewalls, filters, antispam/antivirus gateways, proxies, and the like on secondary server 180. In another example, secondary server 180 may be configured to respond with one or more predefined commands upon receiving a network connection. Some bots are designed to self-destruct upon receiving particular commands and secondary server 180 could be configured to respond to a network connection with such commands, thereby causing a bot that has been redirected to secondary server 180 to be destroyed.

Another network level specific policy includes switching virtual local area network (VLAN) membership to another VLAN port. In this example, VLAN membership could be switched for the port associated with an untrusted program file. Although switching VLAN membership to another port would effectively move all of the network traffic on that port rather than individual streams, the alternate VLAN could be configured to force the network traffic through additional firewalls, filters, antispam and antivirus gateways, proxies, and the like. This type of restriction could be particularly useful if network protection device 400 is configured as a layer 2 managed switch.

In another example embodiment, network protection device 400 may be adapted to do a deeper packet inspection to determine whether multiple conversation streams are being transferred over a single port and to identify the stream associated with the untrusted program file to which the applicable network restriction and logging rules apply. Thus, in this embodiment, a policy could be configured so that network restriction or logging rules are crafted to selectively block and/or log the particular stream associated with the untrusted program file, while allowing other streams to continue connections over the same port.

Turning back to step 570 of FIG. 5, a network restriction rule is created using process traffic mapping information and/or any applicable policies and then pushed to network protection device 400. For example, if a policy is configured requiring all inbound and outbound network traffic associated with an untrusted program file to be blocked, then the source address and destination port from the process traffic mapping information retrieved in step 540 could be used to create one or more restriction rules to block any inbound or outbound packets having a matching source address and destination port. After the network restriction rule has been created in step 570, it is pushed to network protection device 400 and stored in network rules element 420. Flow then passes to step 580 where a determination is made as to whether the program file being evaluated is the last program file in the software inventory. If it is the last program file, then flow 500 ends. However, if it is not the last program file, then the next program file in the software inventory is retrieved in step 590 and flow loops back to step 530 to determine the trust status of the newly retrieved program file and to create any appropriate network restriction or logging rules for the program file.

Figure 6:
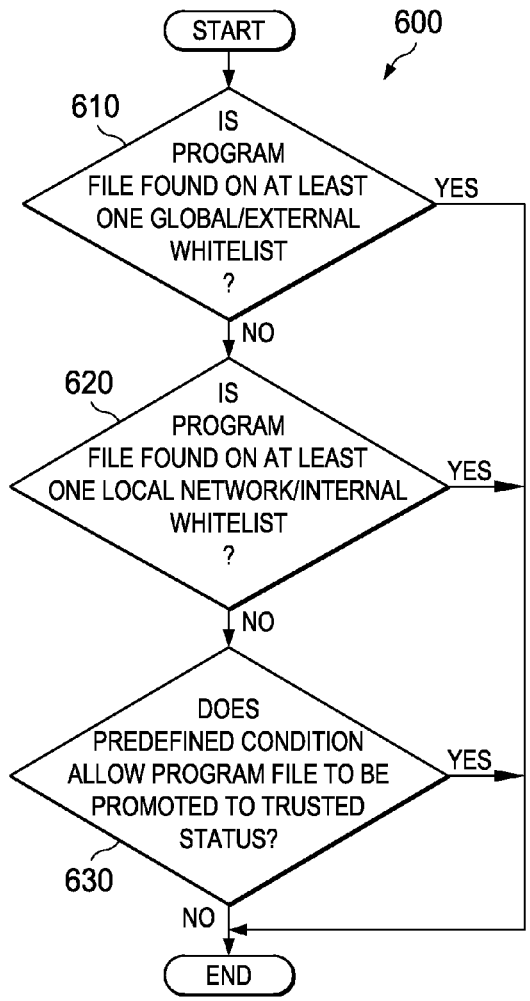
FIG. 6 is a simplified flowchart illustrating a series of example steps of a trust determination flow associated with FIG. 5 in accordance with embodiments of the present disclosure.
Figure 7:
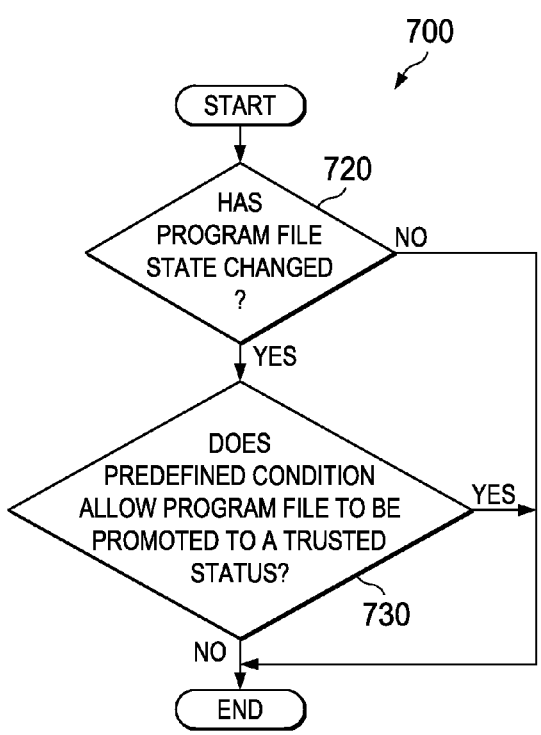
FIG. 7 is a simplified flowchart illustrating a series of example steps of another embodiment of a trust determination flow associated with FIG. 5 in accordance with embodiments of the present disclosure.

Turning to FIGS. 6-7, example flows illustrate alternative embodiments for determining a trust status of program files in the batch processing embodiment of the system for network level protection. The example steps of FIG. 6 or 7 may be implemented at least in part as software trust determination module 240 of central server 200 and may correspond to step 530 of the batch processing embodiment of FIG. 5. FIG. 6 illustrates a trust determination flow 600 using whitelist evaluations, which is performed for each program file in the software inventory pushed to central server 200 from host 300. Flow may begin at step 610 where the current program file is evaluated to determine if it is identified on at least one global whitelist, such as global whitelist 165 shown in FIG. 1, and/or any other whitelist outside of local network 110. As previously described herein, checksums may be used in whitelists to identify program files. If the program file is found on any of the global or other external whitelists in step 610, then a trust status of the program file is defined as trusted, the flow ends, and the trust status is returned to step 530 of FIG. 5. If the program file is not found on the global or other external whitelists in step 610, however, then flow moves to step 620 where one or more internal whitelists, such as internal whitelist 133, may be searched. Organizations may employ multiple whitelists (e.g., an organization-wide whitelist, an enterprise level whitelist, etc.). If the program file is found on any internal whitelist, then the trust status of the program file is defined as trusted, the flow ends, and the trust status is returned to step 530 of FIG. 5.

If the program file is not found on any internal or external whitelist in steps 610 and 620, however, then the program file has an untrusted status. Flow may then move to step 630 where the program file may be evaluated to determine whether any predefined condition exists that allows the program file to be promoted from the untrusted status to a trusted status. Such predefined conditions may include heuristic considerations such as, for example, software owned by an administrator, file access controls, file attributes (e.g., creation time, modification time, etc.), and the like. In one example, an untrusted program file owned by an administrator could be promoted to a trusted status and, therefore, flow could end and the trust status could be returned to step 530 of FIG. 5. If the program file does not satisfy any predefined condition in step 630, however, then the untrusted status persists such that the program file is defined as untrusted, the flow ends, and the trust status is returned to step 530 of FIG. 5.

Trust determination flow 600 may also include additional logic (not shown) to evaluate blacklists in addition to whitelists. Blacklists identify software program files known to be malicious. Blacklists may be provided by numerous sources including Artemis and Anti-Virus databases provided by McAfee, Inc., and locally maintained blacklists within a local network. In this embodiment, if the program file is found on any internal or external blacklist, then the program file is defined as untrusted.

Turning to FIG. 7, FIG. 7 illustrates an alternative embodiment of a trust determination flow 700, corresponding to step 530 of FIG. 5, which may be performed for each program file in the software inventory. Flow may begin at step 720 where the current program file is evaluated to determine whether it has changed. If a current state of the program file has not changed from a previous state, then a trust status of the program file is defined as trusted, the flow ends, and the trust status is returned to step 530 of FIG. 5. If the current state of the program file has changed from the previous state, however, then the program file has an untrusted status. Existing change tracking products (e.g., McAfee® Change Control software, McAfee® Application Control software, McAfee® ePolicy Orchestrator software, McAfee® Policy Auditor software, Tripwire® software manufactured by Tripwire, Inc. of Portland, Oreg., etc.) may be used to examine change data of the program files to determine whether a change has occurred. In one example, change records may be aggregated centrally at central server 200, and McAfee® ePO software may make the determination whether the program file has changed.

Referring again to step 720 of FIG. 7, if the program file is determined to have changed and, therefore, to have an untrusted status, flow may then move to step 730 where the program file is evaluated to determine whether any predefined condition exists to allow the program file to be promoted from an untrusted status to a trusted status, as previously described herein with reference to FIG. 6. If one or more predefined conditions exist, then the program file may be promoted to a trusted status. If no predefined condition applies to the program file, however, then the untrusted status persists and the program file may be defined as untrusted. After the trust status determination is made in step 730, then the flow ends and the trust status of the program file is returned to step 530 of FIG. 5.

Alternative implementations to enumerate program files and to determine a trust status will be readily apparent. Embodiments previously shown and described herein refer to enumerating an inventory of executable software on each host in a network, such as host 300, pushing the software inventory to central server 200 and determining the trust status associated with each program file in the inventory. In alternative embodiments, however, the trust determination of software program files could be locally performed by each host and resulting information could be pushed to another location (e.g., central server 200) and/or maintained locally on a local untrusted software inventory.

Locally determining a trust status of software program files could be performed by whitelist evaluations, blacklist evaluations, state change evaluations, or any other suitable trust evaluation technique. In such embodiments an inventory of executable software may be enumerated by, for example, McAfee® software (e.g., Policy Auditor, Application Control, or Change Control). When performing whitelist evaluations as shown in FIG. 6, the host could access internal whitelists on a local network and/or external whitelists accessible through another network, such as the Internet. Program file state change evaluations could also be performed locally by evaluating a current and previous state of the program file for changes, as shown in FIG. 7. For example, McAfee® Change Control software allows a sequence of change records to be locally maintained on hosts, which could be evaluated to determine if any of the program files on a particular host had changed. In addition, the broad scope of this disclosure permits any number of other techniques to be used to determine the trust status of the software program files including, for example, performing both whitelist evaluations and state change evaluations of software program files and/or performing blacklist evaluations of software program files.

The batch processing embodiments shown and described with reference to FIGS. 5-7, may be implemented so that software inventories can be evaluated at predefined time intervals (e.g., hourly, every half hour, etc.), and restriction rules can be created to block network traffic associated with untrusted program files. Thus, the configuration of the network protection device 400 is open by default (i.e., network traffic is allowed unless a rule proscribes it). This open by default approach, however, may create windows of time in which a bot, which has recently infected a host, has not yet been defined as untrusted, and could, therefore, be propagating or performing malicious activities by accessing local or remote networks because no restriction rules have been created to block network traffic associated with the bot. For some businesses, however, this approach may be desirable because the predefined time interval may be insignificant or because alternative approaches may hinder legitimate and necessary business activities.

Other businesses may prefer tighter control and a closed by default approach could be implemented in an alternative embodiment. In the closed by default approach, network protection device 400 could be configured to block all network traffic unless specifically permitted by a rule. All electronic packets intercepted by network protection device 400 could be evaluated to determine whether network rules element 420 contains a rule specifically permitting the intercepted packets to be transmitted (e.g., packets having an allowed source address and port number, packets having an allowed destination address and port number, etc.). In such an embodiment, permission rules, rather than restriction rules, could be created and pushed to network protection device 400 whenever new program files are determined to have a trusted status.

Figure 8:
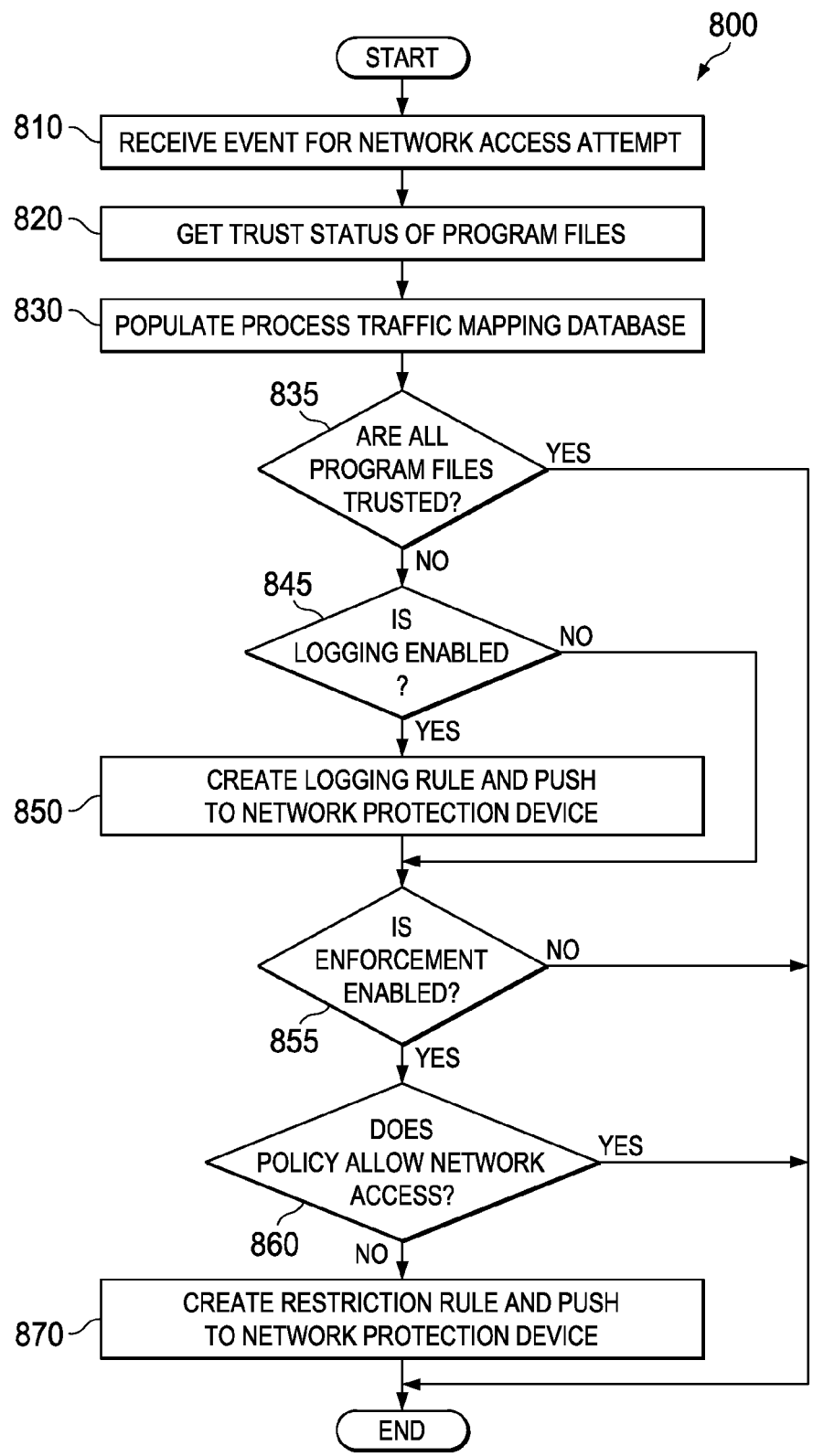
FIG. 8 is a simplified flowchart illustrating a series of example steps associated with other embodiments of the system in accordance with the present disclosure.

Turning to FIG. 8, a real-time processing flow 800 illustrates a flow for real-time embodiments of the system for network level protection that may be implemented at least in part as rule making module 250 of FIG. 2. Flow may begin at step 810 where central server 200 receives host event information (e.g., information related to a network access attempt associated with software process 345 on host 300). In example embodiments, event feed 330 generates host event information and pushes it to central server 200 whenever a software process, such as software process 345 on host 300, attempts network access. The network access attempt may be intercepted using any suitable techniques including those described with reference to the various embodiments in copending U.S. patent application Ser. No. 12/844,892, entitled System and Method for Local Protection Against Malicious Software, filed Jul. 28, 2010, and previously incorporated herein by reference.

Once the network access attempt has been intercepted, a process traffic mapping element provided, for example, in the operating system kernel of host 300 may be queried to determine which program files (e.g., executable files, library modules, object files, other executable modules, script files, interpreter files, etc.) correspond to the network access attempt associated with software process 345. In this example, the network access attempt is mapped to executing software process 345, which could be mapped to an executable file and one or more library modules loaded into executing software process 345. Thus, the host event information that is pushed to central server 200 may include program file paths for the one or more identified program files, the associated program file hashes, a source address and port, and/or a destination address and port of the network access attempt.

After the host event information is received by central server 200 in step 810, flow passes to step 820 to get a trust status of the program files associated with the network access attempt. Determining the trust status of the program files can be accomplished using various techniques, which will be shown and described in more detail in a first embodiment in FIG. 9 (i.e., determining trust statuses using central untrusted software inventory 232) and in another embodiment in FIG. 10 (i.e., determining trust statuses in real-time using central trusted cache 245).

After obtaining the trust status for each of the program files associated with the network access attempt in step 820, flow passes to step 830, which may be implemented, at least in part, as process traffic mapping module 260 of central server 200. In step 830, if any of the program files have an untrusted status, then the host event information may be used to populate process traffic mapping database 234. For example, detailed port and address information and program file path information associated with the program files may be added to process traffic mapping database 234. Flow then passes to step 835 and a query is made as to whether all program files associated with the network access attempt have a trusted status, and if so, flow ends without creating logging or restriction rules for network traffic associated with the program files. However, if any of the program files has an untrusted status, then flow passes to step 845 to determine whether logging is enabled.

If logging is enabled, then flow passes to step 850 where a logging rule may be created and pushed to network protection device 400 to be stored in network rules element 420. In one example, the source address and port number and the destination address and port number from the host event information could be used to create a rule to log particular network event data. In this example, the logging rule could require network traffic event data related to electronic packets intercepted by network protection device 400 to be stored in event log 430 when the intercepted packets have a source address, a source port, a destination address, and a destination port matching the host event information. In some embodiments, a rule ID identifying the logging rule may be stored in process traffic mapping database 234 and mapped to the program files associated with the network access attempt.

After the logging rule has been created and pushed to network protection device 400 in step 850, or if logging was not enabled in step 845, flow passes to step 855 to determine whether enforcement is enabled. If enforcement is not enabled, then the flow ends without creating restriction rules for network traffic associated with the one or more untrusted program files. If enforcement is enabled in step 855, however, then policy database 235 may be queried in step 860 to determine whether any configured policy overrides the untrusted status of the program files to allow network traffic associated with the program files. If such a policy is found, then flow ends without creating a restriction rule. However, if a policy does not override the untrusted status of the program file (i.e., a policy requires some type of restriction rule or no policy is applicable), then flow passes to step 870 where one or more network restriction rules can be created using host event information and/or any applicable policies and then pushed to network protection device 400. In one example, the host event information could be used to create a restriction rule to block any inbound, outbound, and/or local packets having a source address and port and destination address and port matching the source address and port and destination address and port from the host event information. The use of policies to create restriction rules and examples of such policies, including network level specific policies, have been previously described herein with reference to the batch processing flow of FIG. 5.

After the restriction rule has been created using host event information and/or any applicable policies, the restriction rule is pushed to network protection device 400 and stored in network rules element 420 and then the flow ends. In this real-time embodiment, a time-delay may be configured in host 300 after the network access attempt has been intercepted in order to allow real-time processing flow 800 sufficient time to create any necessary rules and push such rules to network protection device 400. In another embodiment, the network access attempt may be held on host 300 until central server 200 acknowledges to host 300 that it has updated process traffic mapping database 234 with mapping information for the network access attempt and/or that it has pushed any resulting logging or restriction rules to network protection device 400. This acknowledgement could be accomplished, for example, via a signal over bidirectional data flow to event feed 330 on host 300.

Figure 9:
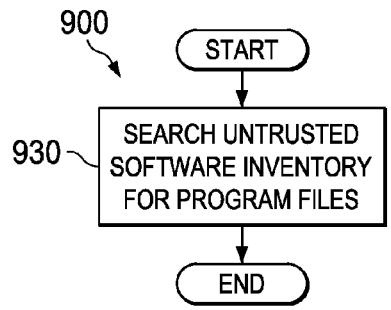
FIG. 9 is a simplified flowchart illustrating an example step of a trust determination flow associated with FIG. 8 in accordance with embodiments of the present disclosure.
Figure 10:
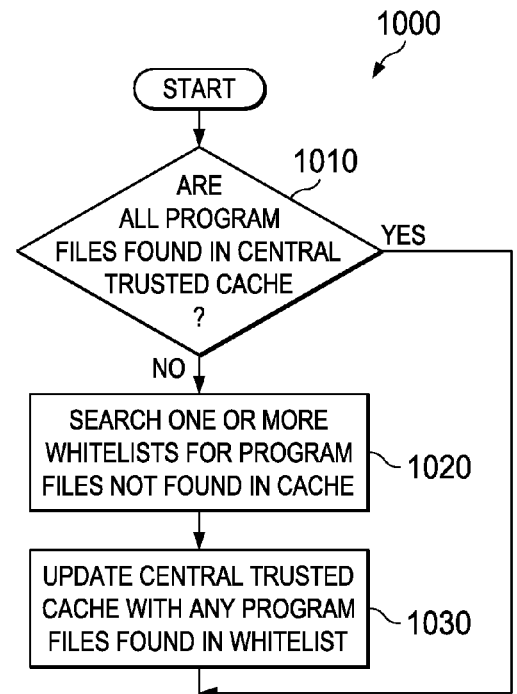
FIG. 10 is a simplified flowchart illustrating a series of example steps of another trust determination flow associated with FIG. 8 in accordance with embodiments of the present disclosure.

Turning to FIGS. 9-10, example flows illustrate alternative embodiments for determining a trust status of program files in the real-time processing embodiment of the system for network level protection. The example steps of FIG. 9 or 10 may be implemented at least in part as software trust determination module 240 of central server 200 and may correspond to step 820 of the real-time processing embodiment of FIG. 8.

FIG. 9 illustrates a trust determination flow 900, utilizing central untrusted software inventory 232. In this embodiment, central untrusted software inventory 232 may be created and maintained, for example, as described with reference to FIGS. 4-6 of copending U.S. patent application Ser. No. 12/844,892, previously incorporated herein by reference. In step 930, central untrusted software inventory 232 is searched for each of the program files associated with the network access attempt. If a program file is identified on central untrusted software inventory 232, then a trust status of the identified program file is untrusted. However, if the program file is not identified on central untrusted software inventory 232, then the trust status of the program file is trusted. After the program files have been evaluated, the trust statuses of the program files are returned to step 820 of FIG. 8, where logging and restriction rules may be created as previously described herein.

Turning to FIG. 10, FIG. 10 illustrates an alternative trust determination flow 1000 corresponding to step 820 of FIG. 8, for performing a real-time trust determination in the real-time embodiment of the system for network level protection. Central untrusted software inventory 232 may be omitted from this embodiment and, alternatively, central trusted cache 245 may be used to store identifications (e.g., checksums) of trusted program files for quicker retrieval and overall processing during the trust status determination.

Beginning in step 1010, a query is made as to whether all program files associated with the network access attempt are found in central trusted cache 245. If all of the program files are found in central trusted cache 245, then all of the program files have a trusted status. Consequently, flow ends and the trust statuses are returned to step 820 of FIG. 8. If any program file is not found in central trusted cache 245, however, then flow passes to step 1020 where one or more global or other external whitelists, such as global whitelist 165 shown in FIG. 1, and/or one or more internal whitelists, such as internal whitelist 133 shown in FIG. 1, are searched for each of the program files not found in central trusted cache 245. If a program file is identified on at least one of the whitelists, then the trust status of the identified program file is defined as trusted, but if a program file is not identified on any of the whitelists, then the trust status of the program file is defined as untrusted. After the whitelists have been searched, flow passes to step 1030 where central trusted cache 245 is updated with checksums of the program files having a trusted status (i.e., identified on one of the whitelists). The trust statuses of the program files can then be returned to step 820 of FIG. 8.

Real-time trust determination flow 1000 may also include additional logic to evaluate a program file not found in any whitelist and consequently having an untrusted status to determine whether a predefined condition exists that allows the untrusted program file to be promoted to a trusted status. Such predefined conditions may include heuristic considerations, which have been previously shown and described herein with reference to FIG. 6. If one or more predefined conditions exist, then the program file may be promoted to a trusted status. If no predefined condition applies to the program file, however, then the untrusted status persists and the program file may be defined as untrusted. Real-time trust determination flow 1000 may also include additional logic (not shown) to evaluate blacklists in addition to whitelists, also previously described herein.

Figure 11:
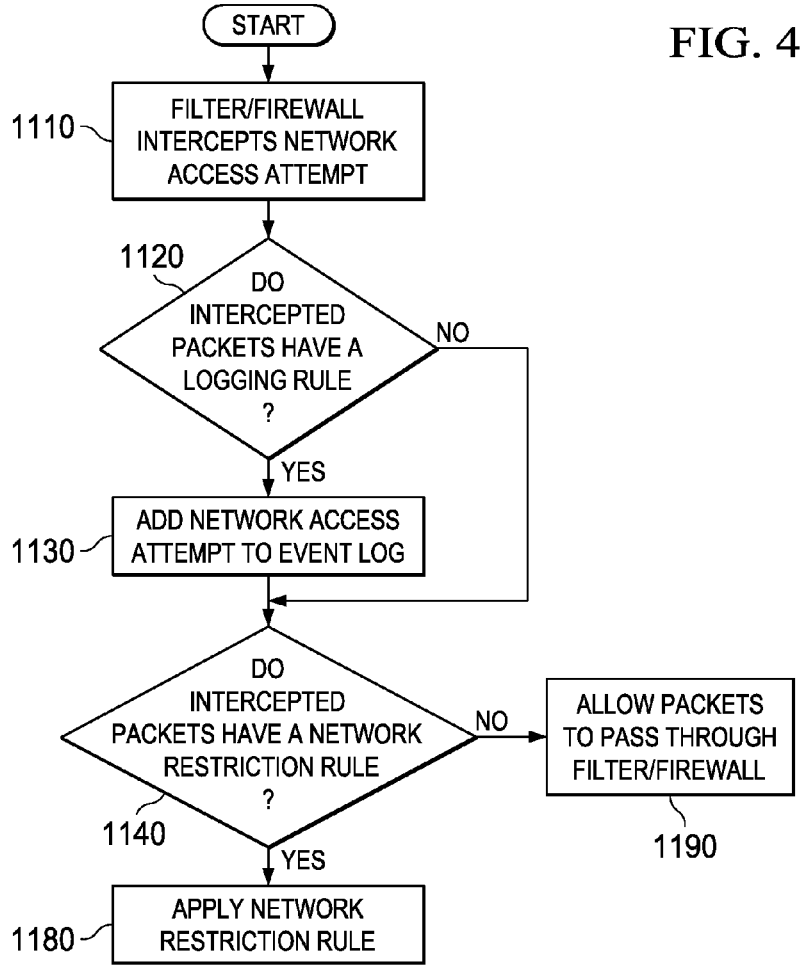
FIG. 11 is a simplified flowchart illustrating another series of example steps associated with the system in accordance with embodiments of the present disclosure.

Turning to FIG. 11, FIG. 11 illustrates a network enforcement flow 1100, of network protection device 400, which may be used with both the batch processing embodiments (FIGS. 5-7) and the real-time embodiments (FIGS. 8-10) of the system for network level protection. Flow may begin at step 1110 where filter/firewall 410 of network protection device 400 intercepts network traffic associated with a software process, such as executing software process 345 on host 300. In example embodiments, TCP/IP network traffic may be in the form of multiple electronic packets. Flow then passes to step 1120 where a query is made as to whether a logging rule applies to the intercepted packets, which may be determined by searching network rules element 420. If a logging rule applies, event log 430 is updated with event data related to the network traffic in step 1130. Once event log 430 is updated, or if no logging rule applies as determined in step 1120, then flow passes to step 1140 where a query is made as to whether a network restriction rule applies to the intercepted packets. This query may be made by searching network rules element 420. If a network restriction rule does not exist for the intercepted packets, then flow passes to step 1190 and the packets are allowed to pass through the filter/firewall 410 to their destination address. If a network restriction rule applies to the intercepted packets, however, then flow passes to step 1180. In step 1180, the network restriction rule is applied to the packets and the packets are restricted accordingly (e.g., packets are blocked, packets are redirected to another server, VLAN membership is switched, etc.).

Figure 12:
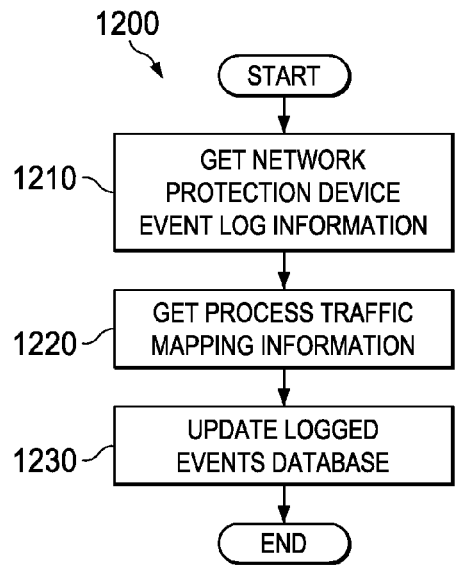
FIG. 12 is a simplified flowchart illustrating yet another series of example steps associated with the system in accordance with embodiments of the present disclosure.

FIG. 12 illustrates a flow 1200 for logging network access attempts, which may be implemented in the batch processing embodiments (FIGS. 5-7) and in the real-time embodiments (FIGS. 8-10) of the system for network level protection. Flow may begin at step 1210 where log records from event log 430 of network protection device 400 are retrieved. In example embodiments, only new log records (e.g., log records added to event log 430 since a last predetermined date and time, log records added to event log 430 since the last update to logged events database 231, etc.) are retrieved. Alternatively, all log records could be retrieved and processed or all log records could be retrieved and flow 1200 could include additional processing to determine which of the log records are new.

After the log records are retrieved from network protection device 400, flow passes to step 1220 where information may be retrieved from process traffic mapping database 234. Process traffic mapping database 234 may provide user-understandable information, such as program file paths and host identification, corresponding to the network traffic event data in the log record. For example, a destination address and port and a source address and port from a log record may be mapped to an untrusted program file path in process traffic mapping database 234. In another example, a rule ID could be used from a log record to find a mapping to an untrusted program file path in process traffic mapping database 234 or, alternatively, in some other separate database or record.

After the user-understandable information is retrieved from process traffic mapping database 234, flow passes to step 1230 where logged events database 231 can be updated with network traffic event data from the log records and any corresponding process traffic mapping information. Examples of possible network traffic event data and corresponding process traffic mapping information stored in logged events database 231 include data associated with intercepted packets such as program file paths, identification of the hosts, a date and time stamp, source address and port numbers, destination address and port numbers, and the like.

With both the batch processing embodiments and the real-time embodiments, flow 1200 may be configured to run at any predetermined intervals of time (e.g., weekly, daily, hourly, etc.). Flow 1200 may, in some embodiments, be implemented as part of administrative protection module 220. Alternatively, in the batch processing embodiments, flow 1200 may be implemented as part of flow 500 shown in FIG. 5. Administrative protection module 220 may provide access to the data in logged events database 231 through, for example, management console 210 or any other reporting mechanisms. The data in logged events database 231 can provide users with information regarding network traffic intercepted by network protection device 400 and associated with untrusted program files on hosts within the network. As previously discussed herein, such network traffic may or may not be blocked or otherwise restricted depending upon whether enforcement is enabled and a corresponding restriction rule has been created and pushed to network protection device 400. Thus, logging event data related to such network traffic and the subsequent processing of that event data in flow 1200 may occur regardless of whether the network traffic is blocked or otherwise restricted.

Software for achieving the operations outlined herein can be provided at various locations (e.g., the corporate IT headquarters, end user computers, distributed servers in the cloud, etc.). In other embodiments, this software could be received or downloaded from a web server (e.g., in the context of purchasing individual end-user licenses for separate networks, devices, servers, etc.) in order to provide this system for network level protection against malicious software. In one example implementation, this software is resident in one or more computers sought to be protected from a security attack (or protected from unwanted or unauthorized manipulations of data).

In other examples, the software of the system for network level protection against malicious software could involve a proprietary element (e.g., as part of a network security solution with McAfee® Application Control software, McAfee® Change Control software, McAfee® ePolicy Orchestrator software, McAfee® Policy Auditor software, McAfee® Artemis Technology software, McAfee® Host Intrusion Prevention software, McAfee® VirusScan software, etc.), which could be provided in (or be proximate to) these identified elements, or be provided in any other device, server, network appliance, console, firewall, switch, router, information technology (IT) device, distributed server, etc., or be provided as a complementary solution (e.g., in conjunction with a firewall), or provisioned somewhere in the network.

In an example local network 110 as shown in FIG. 1, hosts 120, central server 130, network protection device 140, and secondary server 180 are computers that facilitate protecting computer networks against malicious software. As used herein in this Specification, the terms 'computer' and 'computing device' are meant to encompass any personal computers, network appliances, routers, switches, gateways, processors, servers, load balancers, firewalls, or any other suitable device, component, element, or object operable to affect or process electronic information in a network environment. Moreover, this computer or computing device may include any suitable hardware, software, components, modules, interfaces, or objects that facilitate the operations thereof. This may be inclusive of appropriate algorithms and communication protocols that allow for the effective protection and communication of data.

In certain example implementations, the activities involved in network level protection against malicious software outlined herein may be implemented in software. This could be inclusive of software provided in central servers 130 (e.g., central protection components 135), hosts 120 (e.g., local protection components 124), network protection device (e.g., network level enforcement components 145), and/or secondary server 180. These components, elements and/or modules can cooperate with each other in order to perform activities to provide network level protection against malicious software such as botnets, as discussed herein. In other embodiments, these features may be provided external to these elements, included in other devices to achieve these intended functionalities, or consolidated in any appropriate manner. For example, the protection activities could be further localized in hosts 120 or further centralized in central server 130, and some of the illustrated processors may be removed, or otherwise consolidated to accommodate the particular system configuration. In a general sense, the arrangement depicted in FIG. 1 may be more logical in its representations, whereas a physical architecture may include various permutations/combinations/hybrids of these components, elements, and modules.

All of these elements (hosts 120, central server 130, network protection device 140, and/or secondary server 180) include software (or reciprocating software) that can coordinate, manage, or otherwise cooperate in order to achieve the protection activities, including trust determination, logging, enforcement, intercepting, as outlined herein. In addition, one or all of these elements may include any suitable algorithms, hardware, software, components, modules, interfaces, or objects that facilitate the operations thereof. In the implementations involving software, such a configuration may be inclusive of logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.), with the tangible media being inclusive of non-transitory tangible media. In some of these instances, one or more memory elements (as shown in various FIGURES including FIGS. 1, 2, 3 and 4) can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors (as shown in FIGS. 2, 3, and 4) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)) or an ASIC that includes digital logic, software, code, electronic instructions, or any suitable combination thereof.

Any of these elements (e.g., a computer, a server, a network protection device, a firewall, distributed server, etc.) can include memory elements for storing information to be used in achieving the protection activities as outlined herein. These devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., logged events database, central untrusted software inventory, local untrusted software inventory, internal whitelist, policy database, process traffic mapping database, central trusted cache, network rules element, event log, etc.) should be construed as being encompassed within the broad term 'memory element.' Similarly, any of the potential processing elements, modules, and machines described in this Specification should be construed as being encompassed within the broad term 'processor.' Each of the computers, hosts, network protection devices, servers, distributed servers, etc. may also include suitable interfaces for receiving, transmitting, and/or otherwise communicating data or information in a network environment.

Note that with the examples provided herein, interaction may be described in terms of two, three, four, or more network components. However, this has been done for purposes of clarity and example only. It should be appreciated that the system for network level protection against malicious software can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of components or network elements. Therefore, it should also be appreciated that the system of FIG. 1 (and its teachings) are readily scalable. The system can accommodate a large number of components, as well as more complicated or sophisticated arrangements and configurations. Accordingly, the examples provided should not limit the scope or inhibit the broad teachings of the system for network level protection as potentially applied to various other architectures.

It is also important to note that the operations described with reference to the preceding FIGURES illustrate only some of the possible scenarios that may be executed by, or within, the system for network level protection against malicious software. Some of these operations may be deleted or removed where appropriate, or these operations may be modified or changed considerably without departing from the scope of the discussed concepts. In addition, the timing of these operations may be altered considerably and still achieve the results taught in this disclosure. For example, trust determination by searching whitelists may be performed by searching internal whitelists prior to searching external or global whitelists. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
   receiving, at a computing device separate from a first computing device, event information related to a network access attempt initiated by a process executing on the first computing device, wherein the network access attempt is intercepted and held on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;
   determining respective trust statuses for each of the two or more software program files;
   determining, based on the respective trust statuses of the two or more software program files, whether network traffic associated with the process is to be permitted;
   creating a restriction rule to block the network traffic on a network protection device if the network traffic is not to be permitted; and
   pushing the restriction rule to the network protection device, wherein the network traffic is not to be permitted if any one or more of the trust statuses is untrusted, wherein the network access attempt is to be released by the first computing device after the restriction rule is pushed to the network protection device.

2. The method of claim 1, wherein the network protection device is configured to intercept the network traffic associated with the process and apply the restriction rule to the network traffic.

3. The method of claim 2, wherein the network traffic intercepted by the network protection device includes outbound electronic packets from the first computing device, the electronic packets having a destination address corresponding to a second computing device.

4. The method of claim 2, wherein the network traffic intercepted by the network protection device includes inbound electronic packets received from a second computing device and having a destination address corresponding to the first computing device.

5. The method of claim 1, wherein the determining the respective trust statuses includes:
   searching a whitelist identifying trustworthy software program files to determine the respective trust statuses of the executable file and the library module, wherein a particular trust status is defined as untrusted when a corresponding software program file is not identified in the whitelist.

6. The method of claim 1, wherein the process is initiated by the executable file on the first computing device.

7. The method of claim 1, further comprising:
   determining whether all of the trust statuses defined as untrusted are overridden by one or more network access policies to allow the network traffic.

8. The method of claim 1, wherein the network protection device intercepts electronic packets of the network traffic associated with the software program file and applies the restriction rule to the electronic packets, wherein the restriction rule is created using a network access policy selected from a group of network access policies, the group consisting of:
   blocking all inbound electronic packets to the first computing device and all outbound electronic packets from the first computing device;
   blocking all inbound electronic packets to the first computing device;
   blocking all outbound electronic packets from the first computing device;
   blocking all outbound electronic packets from the first computing device to a specified network subnet;
   blocking all outbound electronic packets from the first computing device to the Internet and allowing all outbound electronic packets from the first computing device to a specified subnet;
   blocking all outbound electronic packets from the first computing device to domain name system (DNS) servers;
   blocking all outbound electronic packets from the first computing device using simple mail transfer protocol (SMTP);
   blocking all outbound electronic packets from the first computing device to an Internet Relay Chat (IRC) server;
   blocking all outbound electronic packets having a source address, a source port, a destination address, and a destination port matching a source address, a source port, a destination address, and a destination port of the network access attempt; and
   blocking all inbound electronic packets having a source address, a source port, a destination address, and a destination port matching a source address, a source port, a destination address, and a destination port of the network access attempt.

9. One or more non-transitory tangible media that includes code for execution and when executed by one or more processors is operable to perform operations comprising:
   receiving, at a computing device separate from a first computing device, event information related to a network access attempt initiated by a process executing on the first computing device, wherein the network access attempt is intercepted and held on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;

determining respective trust statuses for each of the two or more software program files;

determining, based on the respective trust statuses of the two or more software program files, whether network traffic associated with the process is to be permitted;

creating a restriction rule to block the network traffic on a network protection device if the network traffic is not to be permitted; and pushing the restriction rule to the network protection device, wherein the network traffic is not to be permitted if any one or more of the trust statuses is untrusted, wherein the network access attempt is to be released by the first computing device after the restriction rule is pushed to the network protection device.

10. The one or more non-transitory tangible media of claim 9, wherein the network protection device is configured to intercept the network traffic associated with the process and apply the restriction rule to the network traffic.

11. The one or more non-transitory tangible media of claim 9, the one or more processors being operable to perform further operations comprising:

searching a whitelist identifying trustworthy software program files to determine the respective trust statuses of the executable file and the library module, wherein a particular trust status is defined as untrusted when a corresponding software program file is not identified in the whitelist.

12. The one or more non-transitory tangible media of claim 9, the one or more processors being operable to perform further operations comprising:

determining whether all of the trust statuses defined as untrusted are overridden by one or more network access policies to allow the network traffic.

13. An apparatus, comprising:

a protection module;

a memory element configured to store instructions associated with the protection module; and one or more processors operable to execute the instructions that when executed, cause the one or more processors to:

receive, at the apparatus separate from a first computing device, event information related to a network access attempt initiated by a process executing on the first computing device, wherein the network access attempt is intercepted and held on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;

determine respective trust statuses for each of the two or more software program files;

determine, based on the respective trust statuses of the two or more software program files, whether network traffic associated with the process is to be permitted;

create a restriction rule to block the network traffic on a network protection device if the network traffic is not to be permitted; and push the restriction rule to the network protection device, wherein the network traffic is not to be permitted if any one or more of the trust statuses is untrusted, wherein the network access attempt is to be released by the first computing device after the restriction rule is pushed to the network protection device.

14. The apparatus of claim 13, wherein the network protection device is configured to intercept network traffic associated with the software program file and apply the restriction rule to the network traffic.

15. The apparatus of claim 13, wherein, when executed, the instructions cause the one or more processors to:

search a whitelist identifying trustworthy software program files to determine the respective trust statuses of the executable file and the library module, wherein a particular trust status is defined as untrusted when a corresponding software program file is not included in the whitelist.

16. A method, comprising:

receiving, at a computing device separate from a first computing device, event information related to a network access attempt initiated by a process executing on the first computing device, wherein the network access attempt is intercepted on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;

determining respective trust statuses for each of the two or more software program files;

determining, based on the respective trust statuses of the two or more software program files, whether network traffic associated with the process is to be permitted;

creating a logging rule to log, by a network protection device, event data related to the network traffic if the network traffic is not to be permitted; and pushing the logging rule to the network protection device, wherein the event data related to the network traffic is to be logged if any one or more of the trust statuses is untrusted, wherein the network access attempt is to be released by the first computing device after the logging rule is pushed to the network protection device.

17. The method of claim 16, wherein the network protection device is configured to intercept the network traffic associated with the process and log the event data related to the network traffic.

18. The method of claim 17, further comprising:

receiving the event data logged by the network protection device;

using selected data from the event data to search a process traffic mapping database for the executable file associated with the network traffic; and updating a logged events memory element to include an entry identifying the executable file.

19. The method of claim 18, wherein the selected data used to search the process traffic mapping database includes a source address and port number and a destination address and port number.

20. The method of claim 18 wherein the selected data used to search the process traffic mapping database includes a rule identifier corresponding to the logging rule.

21. The method of claim 16, wherein the determining the respective trust statuses includes:
searching a whitelist identifying trustworthy software program files to determine the respective trust statuses of the executable file and the library module, wherein a particular trust status is defined as untrusted when a corresponding software program file is not identified in the whitelist.

22. The method of claim 16, wherein the process is initiated by the executable file on the computing device.

23. One or more non-transitory tangible media that includes code for execution and when executed by one or more processors is operable to perform the operations comprising:
receiving, at a computing device separate from a first computing device, event information related to a network access attempt initiated by a process executing on the first computing device, wherein the network access attempt is intercepted on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;
determining respective trust statuses for each of the two or more software program files;
determining, based on the respective trust statuses of the two or more software program files, whether network traffic associated with the process is to be permitted;
creating a logging rule to log, by a network protection device, event data related to the network traffic if the network traffic is not to be permitted; and
pushing the logging rule to the network protection device, wherein the event data related to the network traffic is to be logged if any one or more of the trust statuses is untrusted, wherein the network access attempt is to be released by the first computing device after the logging rule is pushed to the network protection device.

24. The one or more non-transitory tangible media of claim 23, wherein the network protection device is configured to intercept the network traffic associated with the process and log the event data related to the network traffic.

25. The one or more non-transitory tangible media of claim 24, the one or more processors operable to perform further operations comprising:
receiving the event data logged by the network protection device;
using selected data from the event data to search a process traffic mapping database for the executable file associated with the network traffic; and
updating a logged events memory element to include an entry identifying the executable file.

26. The one or more non-transitory tangible media of claim 23, the one or more processors operable to perform further operations comprising:
searching a whitelist identifying trustworthy software program files to determine the respective trust statuses of the executable file and the library module, wherein a particular trust status is defined as untrusted when a corresponding software program file is not identified in the whitelist.

27. An apparatus, comprising:
a protection module;
a memory element configured to store instructions associated with the protection module; and
one or more processors operable to execute the instructions that when executed, cause the one or more processors to:
receive, at the apparatus separate from a first computing device, event information related to a network access attempt initiated by a process executing on the first computing device, wherein the network access attempt is intercepted and held on the first computing device, wherein a process traffic mapping element of the first computing device is queried to determine two or more software program files of a plurality of software program files mapped to the process in the process traffic mapping element of the first computing device, wherein the event information includes information identifying each of the two or more software program files, and wherein at least one software program file of the two or more software program files is an executable file and at least one other software program file of the two or more software program files is a library module loaded by the process;
determine respective trust statuses for each of the two or more software program files;
determine, based on the respective trust statuses of the two or more software program files, whether network traffic associated with the process is to be permitted;
create a logging rule to log, by a network protection device, event data related to the network traffic if the network traffic is not to be permitted; and
push the logging rule to the network protection device, wherein the event data related to the network traffic is to be logged if any one or more of the trust statuses is untrusted, wherein the network access attempt is to be released by the first computing device after the logging rule is pushed to the network protection device.

28. The apparatus of claim 27, wherein the network protection device is configured to intercept the network traffic associated with the process and log the event data related to the network traffic.

29. The apparatus of claim 28, wherein, when executed, the instructions cause the one or more processors to:
receive the event data logged by the network protection device;
use selected data from the event data to search a process traffic mapping database for the executable file associated with the network traffic; and
update a logged events memory element to include an entry identifying the executable file.

30. The apparatus of claim 27, wherein, when executed, the instructions cause the one or more processors to:

search a whitelist identifying trustworthy software program files to determine the respective trust statuses of the executable file and the library module, wherein a particular trust status is defined as untrusted when a corresponding software program file is not identified in the whitelist.

* * * * *